(12) United States Patent
Millington

(10) Patent No.: US 7,668,964 B2
(45) Date of Patent: Feb. 23, 2010

(54) SYSTEM AND METHOD FOR SYNCHRONIZING CHANNEL HANDOFF AS AMONG A PLURALITY OF DEVICES

(75) Inventor: Nicholas A. J. Millington, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 724 days.

(21) Appl. No.: 11/113,363

(22) Filed: Apr. 23, 2005

(65) Prior Publication Data

US 2007/0022207 A1 Jan. 25, 2007

(51) Int. Cl.
*G06F 15/16* (2006.01)
(52) U.S. Cl. ...................... 709/231; 709/248
(58) Field of Classification Search .......... 709/231, 709/248; 700/94; 725/74, 78–85; 455/436–444; 714/799–824
See application file for complete search history.

(56) References Cited

U.S. PATENT DOCUMENTS

| | | | |
|---|---|---|---|
| 5,794,018 A * | 8/1998 | Vrvilo et al. ............... 713/400 |
| 6,009,457 A | 12/1999 | Moller | |
| 6,128,318 A | 10/2000 | Sato | |
| 6,199,169 B1 | 3/2001 | Voth | |
| 6,324,586 B1 | 11/2001 | Johnson | |
| 6,351,821 B1 | 2/2002 | Voth | |
| 6,836,788 B2 | 12/2004 | Kim et al. | |
| 6,907,466 B2 * | 6/2005 | Alexander et al. ......... 709/232 |
| 6,934,766 B1 | 8/2005 | Russell | |
| 7,096,271 B1 * | 8/2006 | Omoigui et al. ............ 709/231 |
| 7,312,785 B2 | 12/2007 | Tsuk | |
| 7,372,846 B2 | 5/2008 | Zwack | |
| 7,386,627 B1 * | 6/2008 | Lango et al. ............... 709/236 |
| 7,430,609 B2 * | 9/2008 | Brown et al. ............... 709/231 |
| 2001/0032188 A1 | 10/2001 | Miyabe | |
| 2002/0090914 A1 | 7/2002 | Kang et al. | |
| 2002/0103919 A1 * | 8/2002 | Hannaway ................. 709/231 |
| 2002/0112244 A1 | 8/2002 | Liou et al. | |
| 2003/0099212 A1 | 5/2003 | Anjum | |
| 2003/0126211 A1 | 7/2003 | Anttila et al. | |
| 2004/0203378 A1 | 10/2004 | Powers | |

OTHER PUBLICATIONS

Tridgell et al., The rsync Algorithm, Jun. 1996, The Australian National University, and associated source code available at http://samba.org/ftp/rsync/src/rsync-0.1.tar.gz—main.c and match.c.*

(Continued)

*Primary Examiner*—Nathan Flynn
*Assistant Examiner*—James E Conaway
(74) *Attorney, Agent, or Firm*—Carr & Ferrell LLP

(57) ABSTRACT

A system constructed comprises a plurality of devices interconnected to a network. At least two of the devices in the system can access streaming audio information over the network, and are capable of providing audio and rendering timing information to other devices in the system. One device, as the handed-off device, is configured to determine correspondences in connection with two information streams received from two information sources. That device comprises an information receiver module, a position identifier module, and a corresponding position utilization module. The information receiver module is configured to receive the two information streams. The position identifier module is configured to identify corresponding positions regarding corresponding sequences in the two information streams. The corresponding position utilization module is configured to utilize the identification of the corresponding positions in the two information streams.

21 Claims, 15 Drawing Sheets

OTHER PUBLICATIONS

International Search Report for Patent Cooperation Treaty application No. PCT/US04/23102, Aug. 1, 2008.*

Huang et al. A Synchronization Infrastructure for Multicast Multimedia at the Presentation Layer. IEEE Transactions on Consumer Electronics, vol. 43, No. 3, Aug. 1997.

Ishibashi et al. A Group Synchronization Mechanism for Stored Media in Multicast Communications. IEEE, 1997.

Ishibashi et al. A Group Synchronization Mechanism for Live Media in Multicast Communications. IEEE, 1997.

Benslimane, Abderrahim, "A Multimedia Synchronization Protocol for Multicast Groups," 2000, IEEE, Proceedings of the 26th Euromicro Conference, 2000, vol. 1, pp. 456-463.

Mills, David, "Precision Synchronization of Computer Networks Clocks," 1994, ACM Computer Communications Review, vol. 24, pp. 28-43.

Bretl et al, "MPEG2 Tutorial," 2000, www.bretl.com, retrieved http://www.bretl.com/mpeghtml/MPEGindex.htm on Jan. 2009, pp. 1-23.

Jo et al., "Synchronized One-to-Many Media Streaming with Adaptive Playout Control," In: Proceedings of SPIE, vol. 4861, Edited by Tescher et al., Dec. 2002, pp. 71-82.

Mills, David L., "Network Time Protocol Specification, Implementation and Analysis," Request for Comments: 1305, Network Working Group, Mar. 1992 (Mar. 2003).

* cited by examiner

```
┌─────────────────────────────────────────┐
│ 100. HANDING-OFF ZONE PLAYER 11(n) THAT IS THE
│ CURRENT AUDIO INFORMATION CHANNEL DEVICE 23
│ FOR A SYNCHRONY GROUP 20 DETERMINES THAT THE
│ AUDIO INFORMATION CHANNEL DEVICE RESPONSIBILITY
│ IS TO BE HANDED OFF TO ANOTHER "HANDED-OFF"
│ ZONE PLAYER 11(n') IN CONNECTION WITH STREAMING
│ AUDIO INFORMATION FROM A STREAMING AUDIO
│ INFORMATION SOURCE 17
└─────────────────────────────────────────┘
                    │
                    ▼
┌─────────────────────────────────────────┐
│ 101. HANDING-OFF ZONE PLAYER 11(n) PROVIDES A
│ NOTIFICATION TO THE HANDED-OFF ZONE PLAYER 11(n')
│ THAT THE HANDED-OFF ZONE PLAYER 11(n') IS TO
│ BECOME THE AUDIO INFORMATION CHANNEL DEVICE
│ FOR THE SYNCHRONY GROUP 20
└─────────────────────────────────────────┘
                    │
                    ▼
┌─────────────────────────────────────────┐
│ 102. AFTER THE HANDED OFF ZONE PLAYER 11(n')
│ RECEIVES INFORMATION FROM THE HANDING-OFF ZONE
│ PLAYER 11(n) AS TO THE AUDIO INFORMATION SOURCE
│ 17 FROM WHICH IT IS TO OBTAIN THE AUDIO
│ INFORMATION STREAM FOR THE AUDIO PROGRAM, THE
│ HANDED-OFF ZONE PLAYER 11(n') ESTABLISHES A
│ CONNECTION TO THE STREAMING AUDIO INFORMATION
│ SOURCE 17 AND BEGINS RECEIVING THE AUDIO
│ INFORMATION STREAM 30 THEREFROM
└─────────────────────────────────────────┘
                    │
                    ▼
┌─────────────────────────────────────────┐
│ 103. HANDING-OFF ZONE PLAYER 11(n) CONTINUES TO
│ PROVIDE THE FRAMES 31(x)^C TO THE SYNCHRONY
│ GROUP 20, INCLUDING THE HANDED-OFF ZONE PLAYER
│ 11(n'), AND HANDED-OFF ZONE PLAYER 11(n')
│ GENERATES FRAME CHECKSUM VALUES 34(x)^C FOR
│ THE FRAMES 31(x)^C THAT IT RECEIVES
└─────────────────────────────────────────┘
                    │
                    ▼
                  ( TO )
                  ( 104 )
```

*FIG. 5*

FRM 106

107. HANDED-OFF ZONE PLAYER 11(n') NOTIFIES THE VARIOUS MEMBERS 21, 22(g) OF THE SYNCHRONY GROUP 20, AFTER WHICH THE MEMBERS CAN BEGIN RECEIVING THE AUDIO AND RENDERING TIMING INFORMATION FROM THE HANDED-OFF ZONE PLAYER 11(n')

108. AFTER ALL OF THE MEMBERS 21, 22(g) HAVE MIGRATED OVER TO THE HANDED-OFF ZONE PLAYER 11(n') AS AUDIO INFORMATION CHANNEL DEVICE 23, THE HANDED-OFF ZONE PLAYER 11(n')) NOTIFIES THE HANDING-OFF ZONE PLAYER 11(n) THAT IT HAS ASSUMED RESPONSIBILITY AS THE AUDIO INFORMATION CHANNEL DEVICE 23 FOR THE SYNCHRONY GROUP, AFTER WHICH THE HANDING-OFF ZONE PLAYER 11(n) CAN TERMINATE OPERATIONS IN CONNECTION THEREWITH

FRM 232 →

233. HANDED-OFF ZONE PLAYER 11(n') DETERMINES WHETHER THE VALUES OF THOSE COUNTERS ARE EQUAL —YES→ TO 200

NO ↓

234. HANDED-OFF ZONE PLAYER 11(n') IDENTIFIES THE COUNTER THAT HAS THE HIGHEST VALUE

↓

235. HANDED-OFF ZONE PLAYER 11(n') SELECTS THE FRAME POINTER THAT IS ASSOCIATED WITH THE COUNTER IDENTIFIED IN STEP 234

FRM 231 ↓

236. HANDED-OFF ZONE PLAYER 11(n') SELECTS THE FRAME POINTER ASSOCIATED WITH THE COUNTER WHOSE VALUE CORRESPONDS TO "M+1"

↓

237. HANDED-OFF ZONE PLAYER 11(n') UTILIZES THE RENDERING TIMING INFORMATION 33(x)^C THAT WAS STORED FOR THE FRAME FROM THE HANDING-OFF ZONE PLAYER 11(n) THAT IS POINTED TO BY THE SELECTED POINTER TO DETERMINE THE RENDERING TIMING INFORMATION FOR THE FRAME FROM THE AUDIO INFORMATION SOURCE 17 THAT IS ALSO POINTED TO BY THE SELECTED POINTER, AND FOR SUBSEQUENT FRAMES FROM THE AUDIO INFORMATION SOURCE 17.

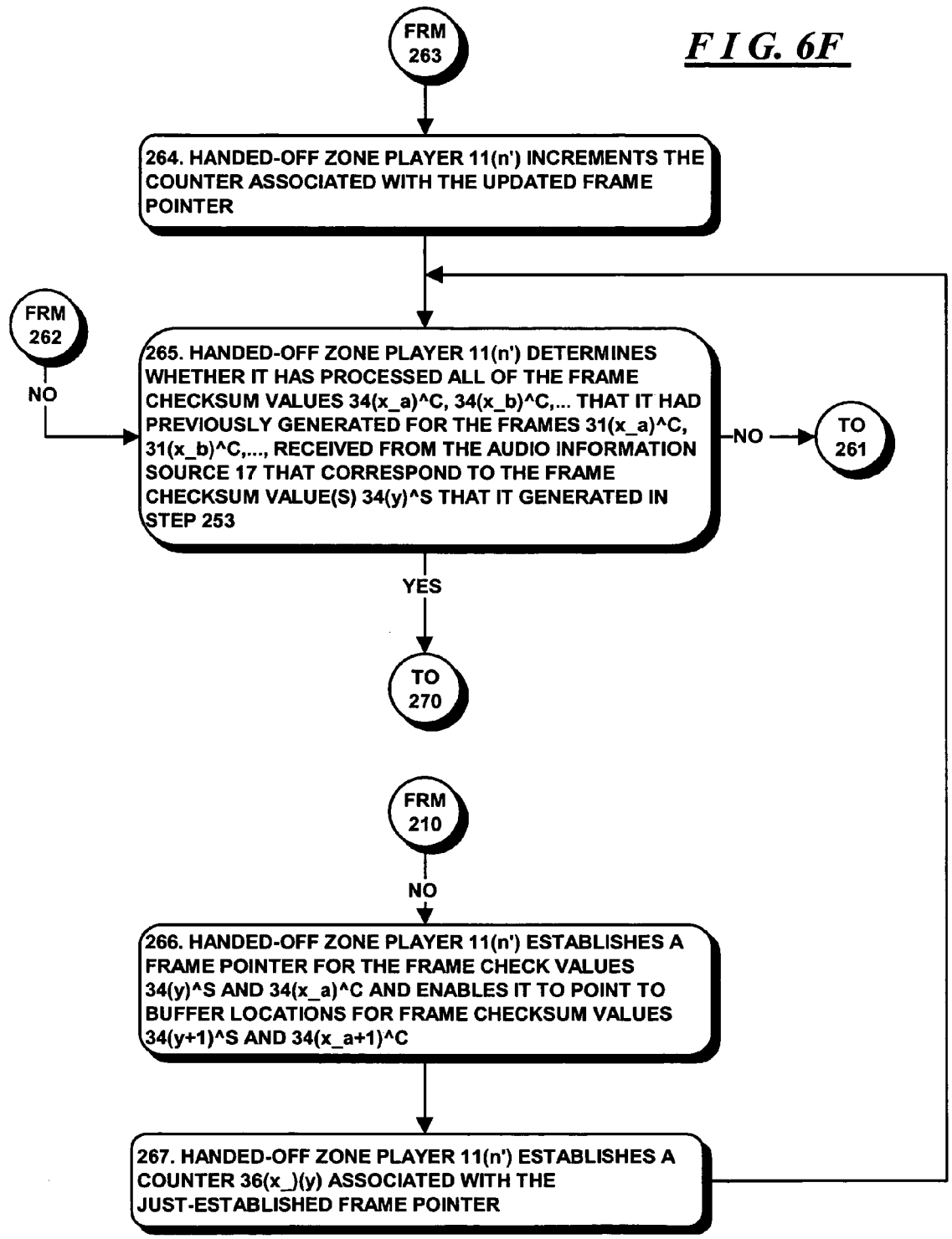

SYSTEM AND METHOD FOR SYNCHRONIZING CHANNEL HANDOFF AS AMONG A PLURALITY OF DEVICES

INCORPORATION BY REFERENCE

U.S. patent application Ser. No. 10/816,217, filed Apr. 1, 2004, in the name of Nicholas A. J. Millington, and entitled "System and Method For Synchronizing Operations Among A Plurality Of Independently Clocked Digital Data Processing Devices," assigned to the assignee of the present application, and incorporated by reference.

FIELD OF THE INVENTION

The present invention relates generally to the field of digital data processing devices, and more particularly to systems and methods for controlling operations among a plurality of independently-clocked digital data processing devices to facilitate synchronization thereamong. The invention is embodied in a system that facilitates synchronizing operations among a group of devices, in relation to information that is provided by a common source. Moreover, the invention is embodied in a system that facilitates formation of a plurality of such groups, each of which can operate in relation to information that is provided by a respective source. One embodiment of the invention enables, within each group, synchronizing of audio rendering as among two or more audio rendering devices that receive audio information through a common channel. In particular, the invention enables synchronizing rendering of streaming audio information that a channel receives over a network such as the Internet, while changing the particular device that is operating as the channel for the group, in such a manner as to minimize the likelihood that there is a discontinuity in the audio being rendered by the group.

BACKGROUND OF THE INVENTION

U.S. patent application Ser. No. 10/816,217, filed Apr. 1, 2004, in the name of Nicholas A. J. Millington, and entitled "System and Method For Synchronizing Operations Among A Plurality Of Independently Clocked Digital Data Processing Devices," (hereinafter referred to as the Millington application) describes an arrangement for synchronizing operations among a plurality of independently clocked digital data processing devices. More specifically, the application describes a network audio system comprising a plurality of devices, which are referred to as "zone players," interconnected by a network. The zone players comprising the network audio system may be distributed throughout any of a number of types of establishments such as residences, office complexes, hotels, conference halls, amphitheaters or auditoriums, as well as many other types of establishments. The zone players can render items of media content that are obtained thereby or otherwise provided thereto in electronic form. In one particular embodiment, the media content is in the form of audio content. The audio content may be provided by any of a number of sources. For example, audio content may be provided by compact disk players, turntables, radio receivers connected to respective ones of the zone players and that provide audio content in analog and/or digital form. In addition, the audio content may be in the form of digital files that may be stored on storage devices, personal computers and the like that are connected to respective ones of the zone players. Furthermore, the audio content may be in the form of digital files that may be retrieved by the zone players over the network. In addition, the audio content may be in the form of streaming audio content that is distributed by a variety of sources over a wide area network such as the Internet that are generally referred to as "Internet radio" sources. As noted above, in addition to obtaining items of media content, the zone players also render the media content, and so each zone player can be connected to one or more transducers, which are typically referred to as speakers, to provide an audible program comprising a series of one or more items of audio content.

In the network audio system described in the Millington application, the zone players that are rendering audio information in synchrony are referred to as a "synchrony group." The zone players comprising the synchrony group receive the audio information, as well as rendering timing information that enables them to render the audio information synchronously, from a common source, which is generally also a zone player in the network audio system. Under some circumstances, it may be desirable to hand off the responsibility of providing audio and rendering timing information from one zone player to another. This may occur if, for example, the zone player that is currently providing audio and rendering timing information to the synchrony group is a member of the synchrony group, but is to disengage from the synchrony group and render another audio program. If the audio information is in the form of files that are retrieved over, for example, the Internet, the handoff from one "handing-off" zone player to another "handed-off" zone player can be coordinated by having the handing-off zone player provide the handed-off zone player with several pieces of information. The handing-off zone player will provide the handed-off zone player with a list of the particular files that contain the audio information that is to be rendered by the synchrony group. The files may be identified by, for example, Uniform Resource Locators (URLs) that enable the files containing the respective items of audio content to be located over the Internet. In addition, the handing-off zone player can provide the handed-off zone player with the particular rendering timing information that it will assign to a particular unit of audio information, which is typically referred to as a "frame," that is located at a particular offset into a particular file. Using that information, the handed-off zone player can, independently of the handing-off zone player, obtain the frames subsequent to the frame at the specified offset from that file, as well as from any subsequent files in the list provided by the handing-off zone player, and, since the differential between the times at which successive frames are to be rendered is generally constant, the handed-off zone player can also generate rendering timing information for the frames that follow the offset as well as for the audio information in the content files subsequent thereto in the list. Therefore, after the handoff occurs, the handed-off zone player can provide the audio and rendering timing information to the members of the synchrony group independently of the handing-off zone player, so that the zone players in the synchrony group will continue to render the audio information synchronously and without a discontinuity in the rendering.

While the above-described operations work satisfactorily if the content items are in the form of files, a problem arises, however, if a handoff is to occur in connection with the audio information that is to be supplied to the synchrony group is not in the form of files, but is instead in the form of streaming audio information. Audio programs in the form of streaming audio information are provided over the Internet by a number of sources, including, for example radio stations and networks that also transmit or broadcast audio programs over conventional AM and FM radio and satellite radio signals, as well as sources that distribute audio programs only over the Internet. As with audio information in the form of files, streaming audio information comprising an audio program also comprises a series of frames. On the other hand, unlike audio information that is in the form of files, streaming audio information does not have a "beginning point" from which an "offset" can be determined. Nor does streaming audio information have frame identifiers by which the individual frames of the audio program can be identified. When a device contacts a streaming audio information source, the source will begin providing frames of the audio information stream that it is also concurrently also providing to other devices that wish to render the source's audio program. After a device begins receiving frames comprising an audio information stream from the source, it will typically buffer a selected number of frames. After the device has buffered the selected number, it will begin rendering the program. The buffering is provided to accommodate the fact that the device may experience temporary delays in receiving frames comprising the audio program for a number of reasons, including network congestion.

As noted above, streaming audio information is not in a form such as files, and so, although the handing-off zone player can provide the handed-off zone player with a URL identifying the source that is providing the streaming audio information for the audio program when a handoff is to occur, the handing-off zone player would be unable to provide a marker, such as an offset into a file, or an identifier for a particular frame of the audio information stream, that the handed-off zone player can associate with a particular rendering timing information from the handing-offzone player. This problem is exacerbated by the fact that a streaming audio information source actually provides streaming audio information over the Internet to each of the devices that is receiving the information over what is effectively a separate audio information stream, even though all of the audio information streams that are provided to all of the devices represent the same audio program. Accordingly, even if the handing-off and handed-off zone players are receiving streaming audio information comprising the same audio program from the same source at the same time, the two zone players may not be receiving the same frames of the audio program at precisely the same time. Accordingly, if, during a handoff operation, the handed-off zone player were to determine the rendering timing information that is to be associated with a frame that it receives from the source based merely on the proximity in the time that it received the frame and the time that it received audio and rendering timing information from the handing-off zone player, after the handed-offzone player begins to provide audio and rendering timing information for the synchrony group and as the various other zone players comprising the synchrony group migrate over to the handed-off zone player during the handoff operations, there may be annoying glitches and discontinuities in the audio program as rendered by the synchrony group. Moreover, since generally the zone players comprising the synchrony group generally will not all migrate over to the handed-off zone player at precisely the same time, there maybe several annoying glitches and discontinuities. Moreover, during the handoff operation, the zone players comprising the synchrony group will not be rendering the program perfectly synchronously.

SUMMARY OF THE INVENTION

The invention provides a new and improved system and method for avoiding discontinuities in rendering of streaming audio information by a network audio system when there is a handoff from one device that is currently supplying audio and rendering timing information to another device that is thereafter to supply audio and rendering timing information.

In brief summary, a system constructed in accordance with the invention comprises a plurality of devices interconnected to a network. At least two of the devices in the system can access streaming audio information over the network, and are capable of providing audio and rendering timing information to other devices in the system. One device, as a handed-off device, is configured to determine correspondences in connection with two information streams received from two information sources. That device comprises an information receiver module, a position identifier module, and a corresponding position utilization module. The information receiver module is configured to receive the two information streams. The position identifier module is configured to identify corresponding positions regarding corresponding sequences in the two information streams. The corresponding position utilization module is configured to utilize the identification of the corresponding positions in the two information streams.

In one embodiment, the streaming audio information is organized into a series of frames, with each frame comprising a series of digital audio samples that are to be rendered by the respective devices. In that case, the handed-off device will generate a sequence of frame checksum values for respective ones of the sequence of frames comprising the audio information stream that it receives from the audio information source, and a sequence of frame checksum values for the respective ones of the sequence of frames comprising the audio information portion of the audio and rendering timing information that it receives from the handing-off zone player. As the handed-off zone player is generating the respective sequences of frame checksum values, it will compare them to try to identify series of a predetermined number of frame checksum values in the two frame checksum value sequences that correspond. After the handed-off zone player has identified the required series in the two sequence frame checksum values, it can determine that the sequences of frames from which those frame checksum values were generated correspond. After identifying corresponding series of frames in the two frame sequences, the handed-off zone player can determine the rendering timing information for the frame series, as well as frames subsequently received, from the audio information source, in relation to the rendering timing information for the frame series as received from the handing-off zone player.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
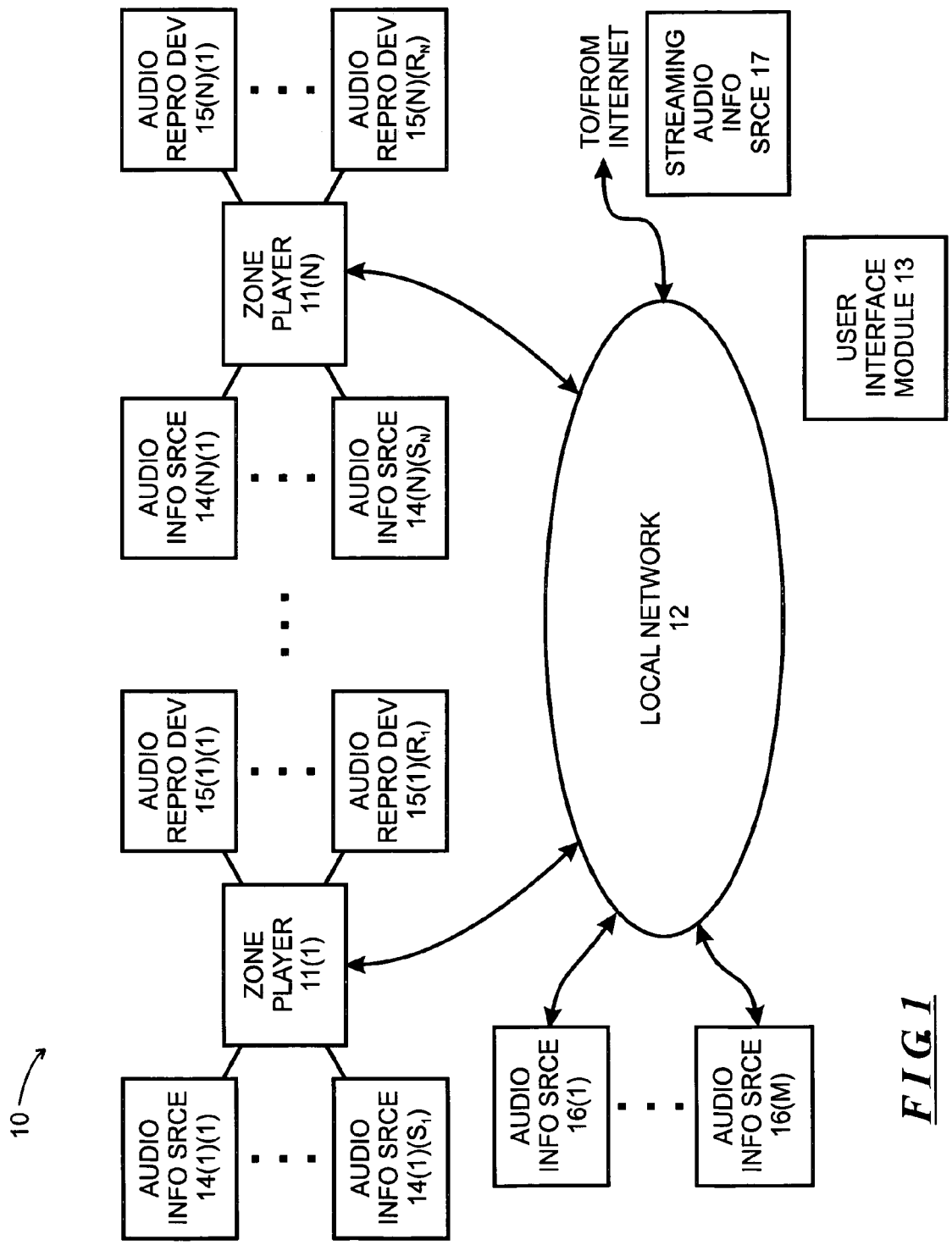
FIG. 1 schematically depicts an illustrative networked audio system, constructed in accordance with the invention.

FIG. 1 depicts an illustrative network audio system 10 constructed in accordance with the invention. With reference to FIG. 1, the network audio system 10 includes a plurality of zone players 11(1) through 11(N) (generally identified by reference numeral 11(n)) interconnected by a local network 12, all of which operate under control of one or more user interface modules generally identified by reference numeral 13. One or more of the zone players 11(n) may also be connected to one or more audio information sources, which will generally be identified herein by reference numeral 14(n)(s), and/or one or more audio reproduction devices, which will generally be identified by reference numeral 15(n)(r). In the reference numeral 14(n)(s), index "n" refers to the index "n" of the zone player 11(n) to which the audio information source is connected, and the index "s" (s=1, . . . , $S_n$) refers to the "s-th" audio information source connected to that "n-th" zone player 11(n). Thus, if, for example, a zone player 11(n) is connected to four audio information sources 14(n)(1) through 14(n)(4), the audio information sources may be generally identified by reference numeral 14(n)(s), with $S_n$=4. It will be appreciated that the number of audio information sources $S_n$ may vary as among the various zone players 11(n), and some zone players may not have any audio information sources connected thereto. Similarly, in the reference numeral 15(n)(r), index "n" refers to the index "n" of the zone player 11(n) to which the audio reproduction device is connected, and the index "r" (r=1, . . . , $R_n$) refers to the "r-th" audio information source connected to that "n-th" zone player 11(n). In addition to the audio information sources 14(n)(s), the network audio system 10 may include one or more audio information sources 16(1) through 16(M) connected through appropriate network interface devices (not separately shown) to the local network 12. Furthermore, the local network may include one or more network interface devices (also not separately shown) that are configured to connect the local network 12 to other networks, including a wide area network such as the Internet, the public switched telephony network (PSTN) or other networks as will be apparent to those skilled in the art, over which connections to audio information sources may be established.

The zone players 11(n) associated with system 10 may be distributed throughout an establishment such as residence, an office complex, a hotel, a conference hall, an amphitheater or auditorium, or other types of establishments as will be apparent to those skilled in the art. For example, if the zone players 11(n) and their associated audio information source(s) and/or audio reproduction device(s) are distributed throughout a residence, one, such as zone player 11(1) and its associated audio information source(s) and audio reproduction device(s) may be located in a living room, another may be located in a kitchen, another may be located in a dining room, and yet others may be located in respective bedrooms, to selectively provide entertainment in those rooms. On the other hand, if the zone players 11(n) and their associated audio information source(s) and/or audio reproduction device(s) are distributed throughout an office complex, one may, for example, be provided in each office to selectively provide entertainment to the employees in the respective offices. Similarly, if the zone players 11(n) and associated audio information source(s) and/or audio reproduction device(s) are used in a hotel, they may be distributed throughout the rooms to provide entertainment to the guests. Similar arrangements may be used with zone players 11(n) and associated audio information source(s) and/or audio reproduction device(s) used in an amphitheater or auditorium. Other arrangements in other types of environments will be apparent to those skilled in the art. In each case, the zone players 11(n) can be used to selectively provide entertainment in the respective locations, as will be described below.

The audio information sources 14(n)(s) and 16(m) may be any of a number of types of conventional sources of audio information, including, for example, compact disc ("CD") players, AM and/or FM radio receivers, analog or digital tape cassette players, analog record turntables and the like. In addition, the audio information sources 14(n)(s) and 16(m) may comprise digital audio files stored locally on, for example, personal computers (PCs), personal digital assistants (PDAs), or similar devices capable of storing digital information in volatile or non-volatile form. As noted above, the local network 12 may also have an interface (not shown) to a wide area network, over which the network audio system 10 can obtain audio information. Moreover, one or more of the audio information sources 14(n)(s) may also comprise an interface to a wide area network such as the Internet, the public switched telephony network (PSTN) or any other source of audio information. In addition, one or more of the audio information sources 14(n)(s) and 16(m) may comprise interfaces to services delivered over, for example, satellite. Audio information obtained over the wide area network may comprise, for example, streaming digital audio information such as Internet radio, digital audio files stored on servers, and other types of audio information and sources as will be appreciated by those skilled in the art. Such sources are generally represented in FIG. 1 by streaming audio information source 17. Other arrangements and other types of audio information sources will be apparent to those skilled in the art.

Generally, the audio information sources 14(n)(s) and 16(m) provide audio information associated with audio programs to the zone players for rendering. A zone player that receives audio information from an audio information source 14(n)(s) that is connected thereto can provide rendering and/or forward the audio information, along with rendering timing information, over the local network 12 to other zone players for rendering. Similarly, each audio information source 16(m) that is not directly connected to a zone player can transmit audio information over the network 12 to any zone player 11(n) for rendering. In addition, as will be explained in detail below, the respective zone player 11(n) can transmit the audio information that it receives either from an audio information source 14(n)(s) connected thereto, or from an audio information source 16(m), to selected ones of the other zone players 11(n'), 11(n"), . . . (n not equal to n', n", . . .) for rendering by those other zone players. The other zone players 11(n'), 11(n"), . . . to which the zone player 11(n) transmits the audio information for rendering may be selected by a user using the user interface module 13. In that operation, the zone player 11(n) will transmit the audio information to the selected zone players 11(n'), 11(n"), . . . over the network 12. As will be described below in greater detail, the zone players 11(n), 11(n'), 11(n"), . . . operate such that the zone players 11(n'), 11(n"), . . . synchronize their rendering of the audio program with the rendering by the zone player 11(n), so that the zone players 11(n), 11(n'), 11(n") provide the same audio program at the same time.

Users, using user interface module 13, may also enable different groupings or sets of zone players to be established to provide audio rendering of different audio programs synchronously. For example, a user, using a user interface module 13, may enable zone players 11(1) and 11(2) to play one audio program, audio information for which may be provided by, for example, one audio information source 14(1)(1). The same or a different user may, using the same or a different user interface module 13, enable zone players 11(4) and 11(5) to contemporaneously play another audio program, audio information for which may be provided by a second audio information source, such as audio information source 14(5)(2). Further, a user may enable zone player 11(3) to contemporaneously play yet another audio program, audio information for which may be provided by yet another audio information source, such as audio information source 16(1). As yet another possibility, a user may contemporaneously enable zone player 11(1) to provide audio information from an audio information source connected thereto, such as audio information source 14(1)(2), to another zone player, such as zone player 11(6) for rendering.

In the following, the term "synchrony group" will be used to refer to a set of one or more zone players that are to play the same audio program synchronously. Thus, in the above example, zone players 11(1) and 11(2) comprise one synchrony group, zone player 11(3) comprises a second synchrony group, zone players 11(4) and 11(5) comprise a third synchrony group, and zone player 11(6) comprises yet a fourth synchrony group. Thus, while zone players 11(1) and 11(2) are playing the same audio program, they will play the audio program synchronously. Similarly, while zone players 11(4) and 11(5) are playing the same audio program, they will play the audio program synchronously. On the other hand, zone players that are playing different audio programs may do so with unrelated timings. That is, for example, the timing with which zone players 11(1) and 11(2) play their audio program may have no relationship to the timing with which zone player 11(3), zone players 11(4) and 11(5), and zone player 11(6) play their audio programs. It will be appreciated that, since "synchrony group" is used to refer to sets of zone players that are playing the same audio program synchronously, zone player 11(1) will not be part of zone player 11(6)'s synchrony group, even though zone player 11(1) is providing the audio information for the audio program to zone player 11(6).

In the network audio system 10, the synchrony groups are not fixed. Users can enable them to be established and modified dynamically. Continuing with the above example, a user may enable the zone player 11(1) to begin providing rendering of the audio program provided thereto by audio information source 14(1)(1), and subsequently enable zone player 11(2) to join the synchrony group. Similarly, a user may enable the zone player 11(5) to begin providing rendering of the audio program provided thereto by audio information source 14(5)(2), and subsequently enable zone player 11(4) to join that synchrony group. In addition, a user may enable a zone player to leave a synchrony group and possibly join another synchrony group. For example, a user may enable the zone player 11(2) to leave the synchrony group with zone player 11(1), and join the synchrony group with zone player 11(6). As another possibility, the user may enable the zone player 11(1) to leave the synchrony group with zone player 11(2) and join the synchrony group with zone player 11(6). In connection with the last possibility, the zone player 11(1) can continue providing audio information from the audio information source 14(1)(1) to the zone player 11(2) for rendering thereby.

A user, using the user interface module 13, can enable a zone player 11(n) to join a synchrony group associated with another zone player (11n'), after which it will be enabled to play the audio program that is currently being played by that synchrony group. Similarly, a user, also using the user interface module 13, can enable a zone player 11(n) that is currently a member of one synchrony group, to disengage from that synchrony group and join another synchrony group, after which that zone player will be playing the audio program associated with the other synchrony group. For example, a zone player 11(6), under control of the user interface module 13, can become a member of a synchrony group that is currently rendering a particular audio program, after which it will play that audio program in synchrony with the other members of the synchrony group. In becoming a member of the synchrony group, zone player 11(6) will obtain information that will enable it to receive audio information associated with the audio program, as well as timing information for rendering. As the zone player 11(6) receives the audio information and the timing information, it will play the audio information with the timing indicated by the timing information, which will enable the zone player 11(6) to play the audio program in synchrony with the other zone player(s) in the synchrony group.

As will be described below in further detail, in each synchrony group, one of the zone players that is a member of the synchrony group operates as the coordinator device for the synchrony group. If a user, using the user interface module 13, enables a zone player 11(n) that is a member of a synchrony group to disengage from that synchrony group, and if the zone player 11(n) is not the coordinator device of the synchrony group, the zone player 11(n) can notify the coordinator device that it is disengaging. Thereafter, the zone player 11(n) can terminate rendering of the audio information that is being rendered by the synchrony group from which it is disengaging. If the user also enables the zone player 11(n) to begin playing another audio program using audio information from an audio information source 14(n)(s) connected thereto, it will acquire the audio information from the audio information source 14(n)(s) and initiate rendering thereof. If the user enables another zone player 11(n') to join the synchrony group associated with zone player 11(n), operations in connection therewith can proceed as described immediately above; in that case, the zone player 11(n) will operate as the coordinator of the synchrony group comprising zone players 11(n) and 11(n').

As yet another possibility, if a user, using the user interface module 13, enables a zone player 11(n) that is a member of a synchrony group to disengage from that synchrony group and join another synchrony group for which another zone player 11(n') is the coordinator device, if the zone player 11(n) is not the coordinator device of the synchrony group from which it is disengaging, the zone player 11(n) can notify the coordinator device of the synchrony group from which it is disengaging. Thereafter, the zone player 11(n) can terminate rendering of the audio information that is being rendered by the synchrony group from which it is disengaging. Contemporaneously, the zone player 11(n) can notify the coordinator device of the synchrony group that it (that is, zone player 11(n)) is joining, after which the coordinator device can begin transmission of audio information and timing information to that zone player 11(n). The zone player 11(n) can thereafter begin rendering of the audio program defined by the audio information, in accordance with the timing information so that the zone player 11(n) will play the audio program in synchrony with the coordinator device.

As yet another possibility, a user, using the user interface module 13, may enable a zone player 11(n) that is not a member of a synchrony group, to begin playing an audio program using audio information provided to it by an audio information source 14(n)(s) that is connected thereto. In that case, the user, also using the user interface module 13 or a user interface device that is specific to the audio information source 14(n)(s), can enable the audio information source 14(n)(s) to provide audio information to the zone player 11(n). After the zone player 11(n) has begun rendering, or contemporaneously therewith, the user, using the user interface module 13, can enable other zone players 11(n'), 11(n"), . . . to join zone player 11(n)'s synchrony group and enable that zone player 11(n) to transmit audio information and timing information thereto as described above, to facilitate synchronous rendering of the audio program by the other zone players 11(n'), 11(n") . . . .

A user can use the user interface module 13 to control other aspects of the network audio system 10, including but not limited to the selection of the audio information source 14(n)(s) that a particular zone player 11(n) is to utilize, the particular items of audio information that are to be rendered and the order in which they are to be rendered, the volume of the audio rendering, and other aspects as will be apparent to those skilled in the art. In addition, a user may use the user interface module 13 to turn audio information source(s) 14(n)(s) on and off and to enable them to provide audio information to the respective zone players 11(n).

Figure 2:
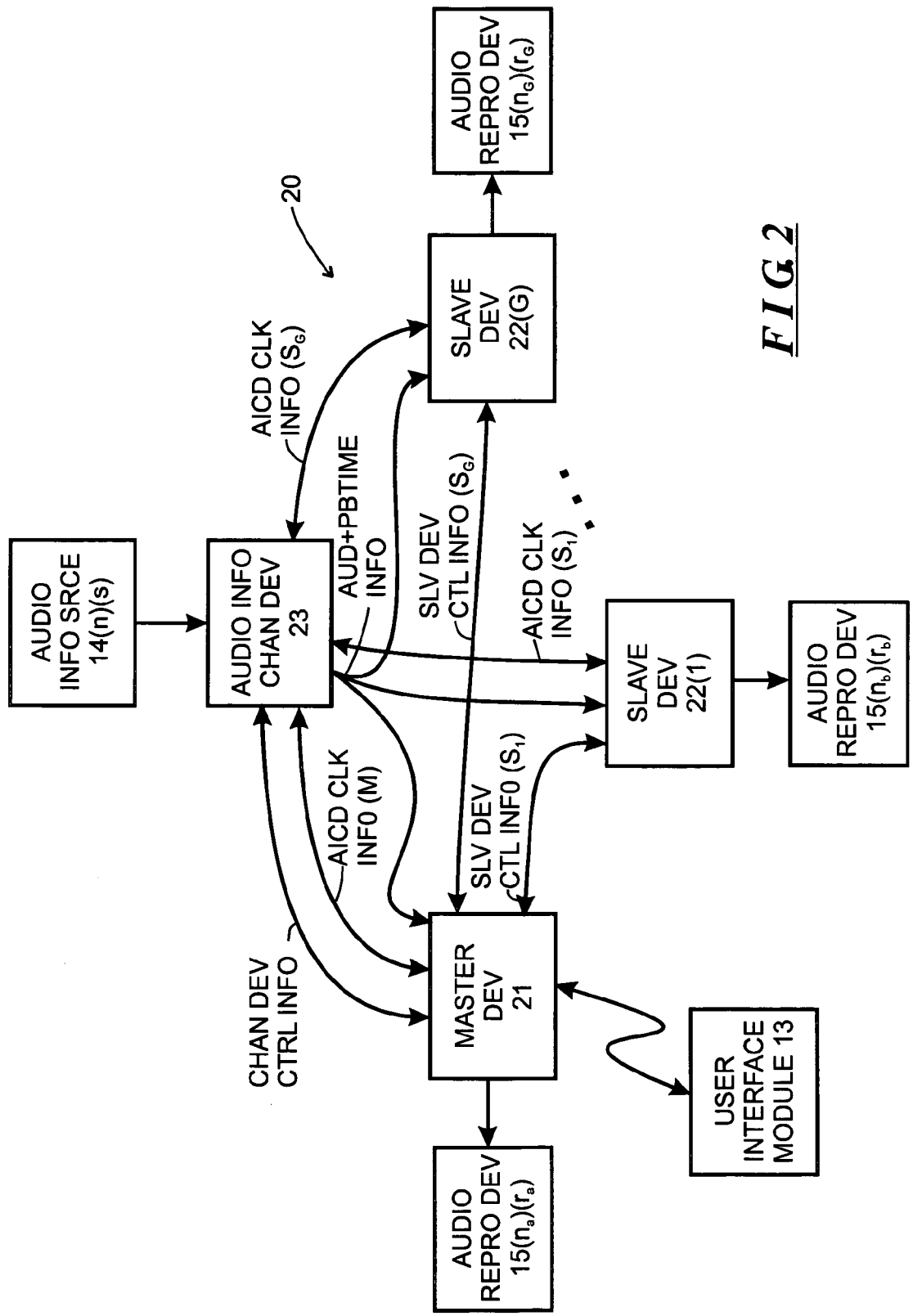
FIG. 2 schematically depicts a functional block diagram of a synchrony group utilizing a plurality of zone players formed within the networked audio system depicted in FIG. 1.

Operations performed by the various devices that are associated with a synchrony group will be described in connection with FIG. 2, which schematically depicts a functional block diagram of a synchrony group in the network audio system 10 described above in connection with FIG. 1. With reference to FIG. 2, a synchrony group 20 includes a coordinator device 21 and zero or more slave devices 22(1) through 22(G) (generally identified by reference numeral 22(g)), all of which synchronously play an audio program provided by an audio information channel device 23. The coordinator device 12 coordinates the operations of the zone players 21, 22(g) comprising the synchrony group and also controls the audio program provided by the audio information channel device 23. Each of the coordinator device 21, slave devices 22(g) and audio information channel device 23 utilizes a zone player 11(n) depicted in FIG. 1, although it will be clear from the description below that a zone player may be utilized both for the audio information channel device 23 for the synchrony group 20, and the coordinator device 21 or a slave device 22(g) of the synchrony group 20. As will be described below in more detail, the audio information channel device 23 obtains the audio information for the audio program from an audio information source, adds rendering timing information, and transmits the combined audio and rendering timing information to the coordinator device 21 and slave devices 22(g) over the network 12 for rendering. The rendering timing information that is provided with the audio information, together with clock timing information provided by the audio information channel device 23 to the various devices 21 and 22(g) as will be described below, enables the coordinator device 21 and slave devices 22(g) of the synchrony group 20 to play the audio information simultaneously.

The coordinator device 21 and the slave devices 22(g) receive the audio and rendering timing information, as well as the clock timing information, that are provided by the audio information channel device 23, and play back the audio program defined by the audio information. The coordinator device 21 is also the member of the synchrony group 20 that communicates with the user interface module 13 and that controls the operations of the slave devices 22(g) in the synchrony group 20. In addition, the coordinator device 21 controls the operations of the audio information channel device 23 that provides the audio and rendering timing information for the synchrony group 20. Generally, the initial coordinator device 21 for the synchrony group will be the first zone player 11(n) that a user wishes to play an audio program. However, as will be described below, the zone player 11(n) that operates as the coordinator device 21 can be handed off from one zone player 11(n) to another zone player 11(n'), which preferably will be a zone player that is currently operating as a slave device 22(g) in the synchrony group.

In addition, under certain circumstances, as will be described below, the zone player 11(n) that operates as the audio information channel device 23 can be handed off from one zone player to another zone player, which also will preferably will be a zone player that is currently operating as a member of the synchrony group 20. It will be appreciated that the zone player that operates as the coordinator device 21 can be handed off to another zone player independently of the handing off of the audio information channel device 23. For example, if one zone player 11(n) is operating as both the coordinator device 21 and the audio information channel device 23 for a synchrony group 20, the coordinator device 21 can be handed off to another zone player 11(n') while the zone player 11(n) is still operating as the audio information channel device 23. Similarly, if one zone player 11(n) is operating as both the coordinator device 21 and the audio information channel device 23 for a synchrony group 20, the audio information channel device 23 can be handed off to another zone player 11(n') while the zone player 11(n) is still operating as the coordinator device 21. In addition, if one zone player 11(n) is operating as both the coordinator device 21 and the audio information channel device 23 for a synchrony group 20, the coordinator device 21 can be handed off to another zone player 11(n') and the audio information channel device can be handed off to a third zone player 11(n").

The coordinator device 21 receives control information from the user interface module 13 for controlling the synchrony group 20 and provides status information indicating the operational status of the synchrony group to the user interface module 13. Generally, the control information from the user interface module 13 enables the coordinator device 21 to, in turn, enable the audio information channel device 23 to provide audio and rendering timing information to the synchrony group to enable the devices 21 and 22(g) that are members of the synchrony group 20 to play the audio program synchronously. In addition, the control information from the user interface module 13 enables the coordinator device 21 to, in turn, enable other zone players to join the synchrony group as slave devices 22(g) and to enable slave devices 22(g) to disengage from the synchrony group. Control information from the user interface module 13 can also enable the zone player 11(n) that is currently operating as the coordinator device 21 to disengage from the synchrony group, but prior to doing so that zone player will enable the coordinator device 21 to transfer from that zone player 11(n) to another zone player 1 (n'), preferably to a zone player 11(n') that is currently a slave device 22(g) in the synchrony group 20. The control information from the user interface module 13 can also enable the coordinator device 21 to adjust its rendering volume and to enable individual ones of the various slave devices 22(g) to adjust their rendering volumes. In addition, the control information from the user interface module 13 can enable the synchrony group 20 to terminate playing of a current track of the audio program and skip to the next track, and to re-order tracks in a play list of tracks defining the audio program that is to be played by the synchrony group 20.

The status information that the coordinator device 21 may provide to the user interface module 13 can include such information as a name or other identifier for the track of the audio work that is currently being played, the names or other identifiers for upcoming tracks, the identifier of the zone player 11(n) that is currently operating as the coordinator device 21, and identifiers of the zone players that are currently operating as slave devices 22(g). In one embodiment, the user interface module 13 includes a display (not separately shown) that can display the status information to the user.

It will be appreciated that the zone player 11(n) that is operating as the audio information channel device 23 for one synchrony group may also comprise the coordinator device 21 or any of the slave devices 22(g) in another synchrony group. This may occur if, for example, the audio information source that is to provide the audio information that is to be played by the one synchrony group is connected to a zone player also being utilized as the coordinator device or a slave device for the other synchrony group.

If the audio information channel device 23 does not utilize the same zone player as the coordinator device 21, the coordinator device 21 controls the audio information channel device by exchanging control information over the network 12 with the audio information channel device 23. The control information is represented in FIG. 2 by the arrow labeled CHAN_DEV_CTRL_INFO. The control information that the coordinator device 21 provides to the audio information channel device 23 will generally depend on the nature of the audio information source that is to provide the audio information for the audio program that is to be played and the operation to be enabled by the control information. If, for example, the audio information source is a conventional compact disc, tape, or record player, broadcast radio receiver, or the like, which is connected to a zone player 11(n), the coordinator device 21 may merely enable the zone player serving as the audio information channel device 23 to receive the audio information for the program from the audio information source. It will be appreciated that, if the audio-information is not in digital form, the audio information channel device 23 will convert it to digital form and provide the digitized audio information, along with the rendering timing information, to the coordinator device 21 and slave devices 22(g).

On the other hand, if the audio information source is, for example, a digital data storage device, such as may be on a personal computer or similar device, the coordinator device 21 can provide a play list to the audio information channel device 23 that identifies one or more files containing the audio information for the audio program. In that case, the audio information channel device 23 can retrieve the files from the digital data storage device and provide them, along with the rendering timing information, to the coordinator device 21 and the slave devices 22(g). It will be appreciated that, in this case, the audio information source may be directly connected to the audio information channel device 23, as, for example, an audio information source 14(n)(s), or it may comprise an audio information source 16(m) connected to the network 12. As a further alternative, if the audio information source is a source available over the wide area network, the coordinator device 21 can provide a play list comprising a list of web addresses identifying the files containing the audio information for the audio program that is to be played, and in that connection the audio information channel device 23 can initiate a retrieval of the files over the wide area network. As yet another alternative, if the audio information source is a source of streaming audio received over the wide area network, the coordinator device 21 can provide a network address from which the streaming audio can be received. Other arrangements by which the coordinator device 21 can control the audio information channel device 23 will be apparent to those skilled in the art.

The coordinator device 21 can also provide control information to the synchrony group's audio information channel device 23 to enable a handing off from one zone player 11(n) to another zone player 11(n'). This may occur if, for example, the audio information source is one of audio information sources 16 or a source accessible over the wide area network via the network 12. The coordinator device 21 can enable handing off of the audio information channel device 23 for several reasons, including, for example, to reduce the loading of the zone player 11(n), to improve latency of message transmission in the network 12, and other reasons as will be appreciated by those skilled in the art.

As noted above, the audio information channel device 23 provides audio and rendering timing information for the synchrony group to enable the coordinator device 21 and slave devices 22(g) to play the audio program synchronously. The audio information channel device 23 transmits the audio and rendering timing information in messages over the network 12 using a multi-cast message transmission methodology. In that methodology, the audio information channel device 23 will transmit the audio and rendering timing information in a series of messages, with each message being received by all of the zone players 11(n) comprising the synchrony group 20, that is, by the coordinator device 21 and the slave devices 22(g). Each of the messages includes a multi-cast address, which the coordinator device 21 and slave devices 22(g) will monitor and, when they detect a message with that address, they will receive and use the contents of the message. The audio and rendering timing information is represented in FIG. 2 by the arrow labeled "AUD+PBTIME_INF0," which has a single tail, representing a source for the information at the audio information channel device 23, and multiple arrowheads representing the destinations of the information, with one arrowhead extending to the coordinator device 21 and other arrowheads extending to each of the slave devices 22(g) in the synchrony group 20. The audio information channel device 23 may make use of any convenient multi-cast message transmission methodology in transmitting the audio and rendering timing information to the synchrony group 20. The audio and rendering timing information is in the form of a series of frames, with each frame having a time stamp. The time stamp indicates a time, relative to the time indicated by a clock maintained by the audio information channel device 23, at which the frame is to be played. Depending on the size or sizes of the messages used in the selected multi-cast message transmission methodology and the size or sizes of the frames, a message may contain one frame, or multiple frames, or, alternatively, a frame may extend across several messages.

The audio information channel device 23 also provides clock time information to the coordinator device 21 and each of the slave devices 22(g) individually over network 12 using a highly accurate clock time information transmission methodology. The distribution of the clock time information is represented in FIG. 2 by the arrows labeled "AICD_CLK_INF (M)" (in the case of the clock time information provided to the coordinator device 21) and "AICD_CLK_INF $(S_l)$" through "AICD_CLK_INF $(S_G)$" (in the case of audio information channel device clock information provided to the slave devices 22(g)). In one embodiment, the coordinator device 21 and slave devices 22(g) make use of the well-known SNTP (Simple Network Time Protocol) to obtain current clock time information from the audio information channel device 23. The SNTP makes use of a unicast message transfer methodology, in which one device, such as the audio information channel device 23, provides clock time information to a specific other device, such as the coordinator device 21 or a slave device 22(g), using the other device's network, or unicast, address. Each of the coordinator device 21 and slave devices 22(g) will periodically initiate SNTP transactions with the audio information channel device 23 to obtain the clock time information from the audio information channel device 23. The coordinator device 21 and each slave device 22(g) make use of the clock time information to determine the time differential between the time indicated by the audio information channel device's clock and the time indicated by its respective clock, and use that time differential value, along with the rendering time information associated with the audio information and the respective device's local time as indicated by its clock to determine when the various frames are to be played. This enables the coordinator device 21 and the slave devices 22(g) in the synchrony group 20 to play the respective frames simultaneously.

As noted above, the control information provided by the user to the coordinator device 21 through the user interface module 13 can also enable the coordinator device 21 to, in turn, enable another zone player 11(n') to join the synchrony group as a new slave device 22(g). In that operation, the user interface module 13 will provide control information, including the identification of the zone player 11(n') that is to join the synchrony group to the coordinator device 21. After it receives the identification of the zone player 11(n') that is to join the synchrony group, the coordinator device 21 will exchange control information, which is represented in FIG. 2 by the arrows labeled SLV_DEV_CTRL_INF ($S_i$) through SLV_DEV_CTRL_INF ($S_G$) group slave control information, over the network 12 with the zone player 11(n') that is identified in the control information from the user interface module 13. The control information that the coordinator device 21 provides to the new zone player 11(n') includes the network address of the zone player 11(n) that is operating as the audio information channel device 23 for the synchrony group, as well as the multi-cast address that the audio information channel device 23 is using to broadcast the audio and rendering timing information over the network. The zone player that is to operate as the new slave device 22(g') uses the multi-cast address to begin receiving the multi-cast messages that contain the audio information for the audio program being played by the synchrony group.

It will be appreciated that, if the zone player 11(n) that is operating as the coordinator device 21 for the synchrony group 20 is also operating as the audio information channel device 23, and if there are no slave devices 22(g) in the synchrony group 20, the audio information channel device 23 may not be transmitting audio and rendering timing information over the network. In that case, if the new slave device 22(g') is the first slave device in the synchrony group, the zone player 11(n) that is operating as both the coordinator device 21 and audio information channel device 23, can begin transmitting the audio and rendering timing information over the network 12 when the slave device 22(g') is added to the synchrony group 20. The zone player 11(n) can maintain a count of the number of slave devices 22(g) in the synchrony group 20 as they join and disengage, and, if the number drops to zero, it can stop transmitting the audio and rendering timing information over the network 12 to reduce the message traffic over the network 12.

The new slave device 22(g') added to the synchrony group 20 uses the network address of the audio information channel device 23 for several purposes. In particular, the new slave device 22(g') will, like the coordinator device 21 (assuming the zone player 11(n) operating as the coordinator device 21 is not also the audio information channel device 23), engage in SNTP transactions with the audio information channel device 23 to obtain the clock timing information from the audio information channel device 23. In addition, the new slave device 22(g') can notify the audio information channel device 23 that it is a new slave device 22(g') for the synchrony group 20 and provide the audio information channel device 23 with its network address. As will be described below, in one embodiment, particularly in connection with audio information obtained from a source, such as a digital data storage device, which can provide audio information at a rate that is faster than the rate at which it will be played, the audio information channel device 23 will buffer audio and timing information and broadcast it over the network 12 to the synchrony group 20 generally at a rate at which it is provided by the source. Accordingly, when a new slave device 22(g') joins the synchrony group 20, the rendering timing information may indicate that the audio information that is currently being broadcast by the audio information channel device 23 using the multi-cast methodology is to be played back some time in the future. To reduce the delay with which the new slave device 22(g') will begin rendering, the audio information channel device 23 can also retransmit previously transmitted audio and timing information that it had buffered to the new slave device 22(g') using the unicast network address of the slave device 22(g').

The coordinator device 21 can also use the slave device control information exchanged with the slave devices 22(g) for other purposes. For example, the coordinator device 21 can use the slave device control information to initiate a handing off of the coordinator device from its zone player 11(n) to another zone player 11(n'). This may occur for any of a number of reasons, including, for example, that the coordinator device 21 is terminating rendering by it of the audio program and is leaving the synchrony group 20, but one or more of the other devices in the synchrony group is to continue playing the audio program. The coordinator device 21 may also want to initiate a handing off if it is overloaded, which can occur if, for example, the zone player 11(n) that is the coordinator device 21 for its synchrony group is also operating as an audio information channel device 23 for another synchrony group.

The user can also use the user interface module 13 to adjust the amplitude or volume of the rendering by the individual zone players 11(n) comprising the synchrony group. In that operation, the user interface module 13 provides information identifying the particular device whose volume is to be adjusted, and the level at which the volume is to be set to the coordinator device 21. If the device whose volume is to be adjusted is the coordinator device 21, the coordinator device 21 can adjust its volume according to the information that it receives from the user interface module 13. On the other hand, if the device whose volume is to be adjusted is a slave device 22(g), the coordinator device 21 can provide group slave control information to the respective slave device 22(g), to enable it to adjust its volume.

The user can also use the user interface module 13 to enable a synchrony group 20 to cancel playing of the track in an audio program that is currently being played, and to proceed immediately to the next track. This may occur, for example, if the tracks for the program is in the form of a series of digital audio information files, and the user wishes to cancel rendering of the track that is defined by one of the files. In that case, when the coordinator device 21 receives the command to cancel rendering of the current track, it will provide channel device control information to the audio information channel device 23 so indicating. In response, the audio information channel device 23 inserts control information into the audio and rendering timing information, which will be referred to as a "resynchronize" command. In addition, the audio information channel device 23 will begin transmitting audio information for the next track, with timing information to enable it to be played immediately. The resynchronize command can also enable rendering of a track to be cancelled before it has been played.

As noted above, there may be multiple synchrony groups in the network audio system 10, and further that, for example, a zone player 11(n) may operate both as a coordinator device 21 or a slave device 22(g) in one synchrony group, and as the audio information channel device 23 providing audio and rendering timing information and clock timing information for another synchrony group.

A zone player 11(n) that is utilized as a member of one synchrony group may also be utilized as the audio information channel device for another synchrony group if the audio information source that is to supply the audio information that is to be played by the other synchrony group is connected to that zone player 11(n). A zone player 11(n) may also be utilized as the audio information channel device for the other synchrony group if, for example, the audio information source is an audio information source 16(m) (FIG. 1) that is connected to the network 12 or an audio information source that is available over a wide area network such as the Internet. The latter may occur if, for example, the-zone player 11(n) has sufficient-processing power to operate as the audio information channel device and it is in an optimal location in the network 12, relative to the zone players comprising the other synchrony group (that is the synchrony group for which it is operating as audio information channel device) for providing the audio and rendering timing information to the members of the other synchrony group. Other circumstances under which the zone player 11(n) that is utilized as a member of one synchrony group may also be utilized as the audio information channel device for another synchrony group will be apparent to those skilled in the art.

As was noted above, the audio information channel device 23 for a synchrony group 20 may be handed off from one zone player 11(n), which will be referred to as the handing-off zone player 11(n), to another zone player 11(n'), which will be referred to as the handed-off zone player 11(n'). It will be appreciated that this can be accomplished if, for example, the audio information source that provides the audio program for the synchrony group is not connected to the zone player 11(n) that is operating as the audio information channel device 23, but instead is an audio information source 16(m) connected to the network 12 or an audio information source that can be accessed over a wide area network such as the Internet. In the following, the audio information source that is providing the audio program for the synchrony group will be identified by reference numeral 17. In addition, it will be assumed that the handed-off zone player 11(n'), that is, the zone player 11(n') that is to become the audio information channel device 23 for the synchrony group 20, is a member 21, 22(g) of the synchrony group 20. Operations performed during a handing off of the an audio information channel device 23 from the handing-off zone player 11(n) to the handed-off zone player 11(n') will generally depend on the nature of the audio information that is being channeled by the audio information channel device 23. Generally, during a handoff operation, the handed-off zone player 11(n') will be provided with several types of information, including, for example:

(a) information that the handed-off zone player 11(n') can utilize to obtain the audio information comprising the audio program being rendered, such as at least the identification of the audio information source 17 that is providing the audio information for the synchrony group, and (b) the identifications of the zone players that are operating as the coordinator device 21 and slave devices 22(g) comprising the synchrony group 20, if the handed-off zone player 11(n') does not already have that information, and if there are any such devices.

It will be appreciated that item (a) may be a URL and/or other indicia that the handed-off zone player 11(n') can use to obtain the audio information. The device that provides the information may comprise, for example, the handing-off zone player 11(n), the group coordinator 21 for the synchrony group, or the user interface module 13 for the network audio system 10. After the handed-off zone player 11(n') receives the above-described information, it will begin receiving the audio information from the audio information source 17 that had been identified by the zone player 11(n) (item (a) above), and attempt to find a position in the audio information that it is receiving from the audio information source 17 that corresponds to a position in the audio information that it is receiving from the handing-off zone player 11(n). It will be appreciated that, since the handed-off zone player 11(n') is a member of the synchrony group 20 for which the handing-off zone player 11(n) is currently the audio information channel device, it will also be receiving the audio and rendering timing information from the handing-off zone player 11(n). After the handed-off zone player 11(n') has determined the corresponding positions, it can associate the rendering timing information that the handing-off zone player 11(n) associated with that audio information with the audio information at the identified position in the audio information stream that it is receiving from the audio information source 17. Using the rendering timing information for that position in the audio information as provided by the handing-off zone player 11(n), as the appropriate rendering timing information for the corresponding position in the audio information as provided by the audio information source 17, the handed-off zone player 11(n') can determine the appropriate rendering timing information for the audio information in subsequent portions of the audio information that it receives from the audio information source 17, and would be able to provide the audio information from the audio information source 17, along with the rendering timing information, to the members 21, 22(g) of the synchrony group 20 in such a manner as to avoid discontinuities in the rendering of the audio information by the synchrony group 20.

Accordingly, after the handed-off zone player 11(n') has identified the position in the audio information stream that it is receiving from the audio information source 17 that corresponds to the position in the audio information that it is receiving from the handing-off zone player 11(n), it can assemble the audio information into frames, if the audio information is not already organized in frames, associate each frame with a time stamp indicating the time at which it is to be rendered, and render the audio information at the time specified by the rendering timing information. In addition, if there are any additional members 21, 22(g) of the synchrony group, the handed-off zone player 11(n') will transmit the audio and rendering timing information that it generates over the network 12. In addition, the zone player 11(n') will notify the zone players that are operating as the coordinator device 21 and slave devices 22(g) of the synchrony group 20 that it is the new audio information channel device 23 for the synchrony group 20, and provide the multi-cast address that it will be using to multi-cast the audio and rendering timing information, as well as its unicast network address. After the members of the synchrony group 20 receive the notification from the zone player 11(n') indicating that it is the new audio information channel device 23 for the synchrony group 20, they will receive the audio and rendering timing information from the zone player 11(n') instead of the zone player 11(n), using the multi-cast address provided by the zone player 11(n'). In addition, they can utilize the zone player 11(n')'s unicast network address to obtain current time information therefrom. It will be appreciated that the zone player 11(n') will determine its current time in relation to the current time information that it last received from the zone player 11(n) using the SNTP protocol as described above.

Generally, the particular operations that the handed-off zone player 11(n') performs in determining the corresponding positions in the audio information that it receives from the audio information source 17 will depend on the particular by which the audio information source 17 delivers the audio information. There are two general methodologies by which the information is delivered. In one methodology, the audio information is stored in the form of one or more audio information files, and the zone player that is operating as the audio information channel device 23 will retrieve the file or files from the audio information source 17. In the other methodology, the audio information is not stored in the form of files, but instead is supplied as an audio information stream.

Operations performed by the handed-off zone player 11(n') if the audio information is in the form of one or more files are described in the Millington application. Generally, if the audio information is stored in the form of files, such as maybe the case if the audio information comprises MP3 or WAV files that are available from sources such as sources 16(m) connected to the network 12 or over from sources available over a wide area network such as the Internet, the handed-off zone player 11(n') will be provided with the following information:

(c) a list of the audio information files containing the audio information that is to be played; and (d) the identification of a file in that list and an offset into the file, as well as rendering timing information that the zone player 11(n) either has associated with the audio information at the offset, or will associate with the audio information at the offset, in addition to items (a) and (b) above. After the zone player 11(n') receives the information from the zone player 11(n), it will begin retrieving audio information from the file identified in item (d), starting at the identified offset. In addition, the zone player 11(n') can assemble the retrieved audio information into frames, if the audio information is not already organized in frames, associate each frame with a time stamp is to indicate the time at which the frame is to be rendered, and transmit the resulting audio and rendering timing information over the network 12. In generating the rendering timing information to be used as the time stamp for each frame, the handed-off zone player 11(n') will make use of the rendering timing information that it received in item (d) above, and the fact that the time differential between two successive frames is a constant.

In addition, the zone player 11(n') will notify the zone players that are operating as the coordinator device 21 and slave devices 22(g) of the synchrony group 20 that it is the new audio information channel device 23 for the synchrony group 20, and provide the multi-cast address that it will be using to multi-cast the audio and rendering timing information, as well as its unicast network address. After the members of the synchrony group 20 receive the notification from the zone player 11(n') indicating that it is the new audio information channel device 23 for the synchrony group 20, they will receive the audio and rendering timing information from the zone player 11(n') instead of the zone player 11(n), using the multi-cast address provided by the zone player 11(n'). In addition, they can utilize the zone player 11(n')'s unicast network address to obtain current time information therefrom. It will be appreciated that the zone player 11(n') will determine its current time in relation to the time stamp that is provided by the zone player 11(n) (reference item (b) above) or the current time information that it received from the zone player 11(n) using the SNTP protocol as described above. The zone player 11(n') will process successive audio information files in the list that it receives from the zone player 11(n) (reference item (c)).

The arrangement described above in connection with audio information that is obtained from the audio information source 17 in the form of one or more files. A problem arises, however, in connection with streaming audio information, since there is no file and offset that the handing-off zone player 11(n) and handed-off zone player 11(n') can use to enable the handed-off zone player 11(n) to associate particular audio information in the stream with particular rendering timing information. The invention provides an arrangement by which the zone player 11(n) that is operating as the audio information channel device 23 for the synchrony group 20, can hand off the responsibility of operating as the audio information channel device to another zone player 11(n') in connection with streaming audio information that can be obtained from, for example, the audio information source 17, over a wide area network such as the Internet. One problem that is addressed by the invention is as follows. It will be appreciated that, in the network audio system 10, both the handing off zone player 11(n) and the handed off zone player 11(n') can receive a digital audio information stream for the same audio program from the same audio information source 17 over, for example, the Internet. However, although both of the zone players 11(n) and 11(n') will be receiving the same audio program from the audio information source 17, the two zone players 11(n), 11(n') will be receiving the information over the Internet over separate streams, and so it cannot be assumed that they will necessarily be receiving frames comprising the streams simultaneously. Moreover, even if the zone players 11(n), 11(n') receive a frame simultaneously, processing delays that may be incurred handing-off zone player 11(n) in generating the rendering time information transmitting the audio and rendering time information to the synchrony group 20 will generally ensure that there will be some time differential between the time that the handed-off zone player 11(n') receives the frame from the audio information source 17 and the time it receives the audio and rendering time information containing the same frame from the handing-off zone player 11(n).

As a result, the two zone players 11(n), 11(n') will not necessarily receive precisely the same audio content from the audio information source 17 at precisely the same time. Accordingly, the handed off zone player 11(n') cannot necessarily rely on the timing with which it receives audio information from the audio information source 17 to determine the rendering timing information indicating the time at which the audio information that it receives from the audio information source is to be rendered. In particular, the handed off zone player 11(n') will need to determine the particular portions of the audio information stream that it receives from the audio information source 17 that are, in turn, to be associated with particular rendering times that are indicated by rendering timing information as generated by the handing off zone player 11(n) and provided by it to the synchrony group 20. After the handed off zone player 11(n') has been able to associate the various portions of the audio information stream that it receives from the audio information source 17 that are, in turn, associated with particular rendering times indicated by the rendering timing information as determined by the handing off zone player 11(n), the handed off zone player 11(n') can thereafter generate the rendering timing information for the audio information stream and provide the audio and rendering timing information to the various members of the synchrony group 20 in such a manner that there will be no discontinuity in the rendering by the members 21, 22(g) of the synchrony group 20.

Figure 3:
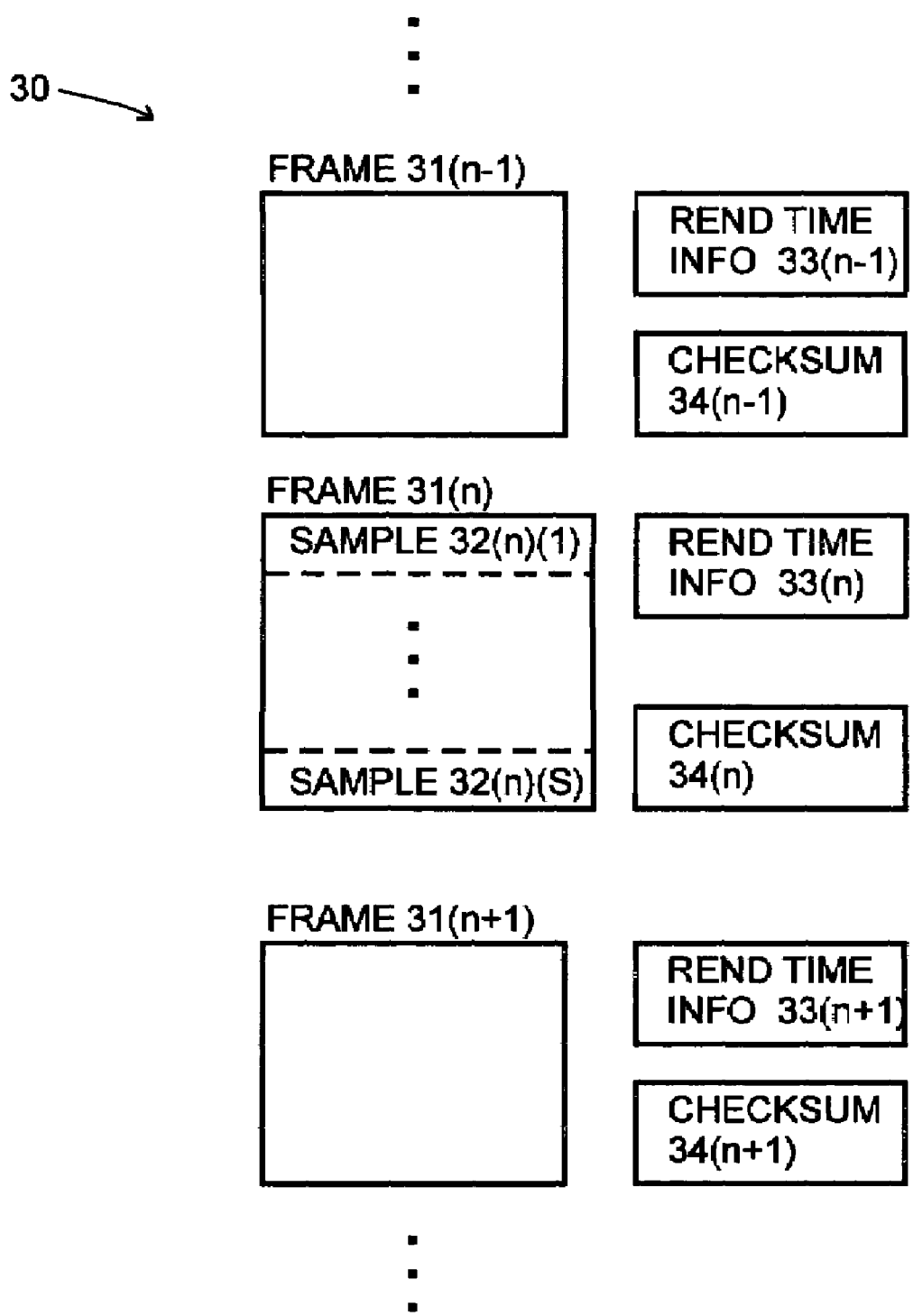
FIG. 3 depicts information relating to an audio information stream that is useful in understanding the operations performed by the network audio system in connection with the invention.

Before proceeding further, it would be helpful to describe in more detail the structure of an audio information stream that both the handing off zone player 11(n) and the handed off zone player 11(n') would receive from the audio information source 17, and the information that the handing off zone player 11(n) provides to the handed off zone player 11(n') in order to facilitate the handing off 5 operation. This will be described in connection with FIG. 3. With reference to FIG. 3, the audio information stream 30 comprises a series of audio information frames which will generally be identified by reference numeral 31(n). Each audio information frame 31(n) comprises a series of audio information samples 32(n)(1) through 32(n)(S) (generally identified by reference numeral 31(n)(s)). Each audio information sample 31(n)(s) represents a digital value.

The audio information stream 30 will be provided by the audio information source 17 and received by the zone player that is operating as the audio information channel device 23 for the synchrony group 20. As described above, generally, the audio information channel device will provide the audio information stream 30, along with rendering timing information, to the synchrony group 20 for rendering. In that case, each frame 31(n) will be associated with rendering timing information 33(n) that the members 21, 22(g) of the synchrony group 20 will use to determine when the audio information in the respective audio information frame 31(n) is to be rendered. It will be appreciated that the zone player operating as the audio information channel device 23 may directly provide the series of frames 31(n) comprising the audio information stream to the members 21, 22(g) of the synchrony group 20, or, alternatively, it may re-process and/or reorganize the information in the frames 31(n) that it receives from the audio information source 17 to provide frames having a different number "S" of samples 32(n)(s) than are contained in frames 31(n) as received from the audio information source 17, and/or frames having different sampling or compression characteristics than the frames 31(n) that comprise the stream 30 that is received from the audio information source 17. For example, if the audio information source 17 provides an audio information stream 30 in the MP3 format, whereas the members 21, 22(g) of the synchrony group are to receive audio information in the WAV format for rendering, the audio information channel device 23 will convert the audio information stream that it receives from the audio information source 17 from the MP3 format to the WAV format, associate the respective WAV frames with rendering timing information, and transmit the WAV audio and rendering timing information to the members 21, 22(g) of the synchrony group for rendering. It will be appreciated that any such re-processing or reorganizing operations will be apparent to those skilled in the art and will not be described herein. In the following, it will be assumed that the zone player operating as the audio information channel device 23 for a synchrony group 20 does not re-process or reorganize the audio information in the frames 31(n) comprising the audio information stream 30 that it receives from the audio information source 17, but instead provides the frames 31(n) as they are received from the audio information source 17, along with the associated rendering timing information 33(n), to the members 21, 22(g) of the synchrony group 20 for rendering.

As noted above, the invention provides an arrangement by which the handing-off zone player 11(n) that is operating as the audio information channel device 23 for the synchrony group 20, can hand off the responsibility of operating as the audio information channel device to the handed-off zone player 11(n') in connection with streaming audio information. In the following, it will be assumed that the handed-off zone player 11(n') is a member of the synchrony group 20, either as group coordinator 21 or as a member 22(g). During a handoff operation, the handed-off zone player 11(n') will also make use of frame checksum values 34(n) in achieving a discontinuity-free handing off. The frame checksum values 34(n) may be provided by the handing-off zone player 11(n) or the handed-off zone player 11(n') itself may generate the frame checksum values 34(n) during the handoff operation after it has received the respective frames from the handing-offzone player 11(n). In the following, it will be assumed that the handed-off zone player 11(n') generates the frame checksum values 34(n) for the frames 31(n) that it receives from the handing-off zone player 11(n). In any case, the handing off zone player 11(n) or the handed-off zone player 11(n') may generate the frame checksum values 34(n) in any convenient manner.

As noted above, during a handoff operation, both the handing off zone player 11(n) and the handed off zone player 11(n') can receive streaming audio information comprising the same audio program from the audio information source 17, but they will receive the audio program over the Internet over separate audio information streams. In that case, the handed off zone player 11(n') will need to identify the frame in the audio information stream that it receives from the audio information source 17, that corresponds to a particular frame in the audio information that the handing-off zone player 11(n) is providing to the synchrony group 20. After it has accomplished that, it can associate the identified frame in the audio information stream that it is receiving from the audio information source 17 with the particular rendering information time 33(n) that was provided by the handing-off zone player 11(n) for the corresponding frame, so that, as the hand-off proceeds, the handed off zone player 11(n') can begin supplying audio information frames 31(n) to the synchrony group 20 along with rendering timing information 33(n) that will enable the various members of the synchrony group to render the audio information in the respective frames 31(n) without a discontinuity in the 11 rendering. To enable the handed-off zone player 11(n') to identify the corresponding frames in the audio information stream from the audio information source 17 and the audio information provided by the handing-off zone player 11(n), the handed off zone player 11(n') will also generate checksum values for the various frames that it receives from the audio information source 17, and compare the checksum values that it generates to the checksum values that it receives from the handing off zone player 11(n). It will be appreciated that the frame checksum value that the handed-off zone player 11(n') generates for a single frame 31(x) that it receives from the handing-offzone player 11(n) may have the same value as the checksum value as for a different frame 31(y) received from the audio information source 17. However, it will be appreciated that, if the handed off zone player 11(n') determines that the series of checksum values for a series of frames $31(x_1) \ldots 31(x_1+M)$ received from the handing-off zone player 11(n) corresponds to the series of checksum values $31(y_1) \ldots 31(y_1+M)$ received from the audio information source 17, it can determine with a reasonably high degree of confidence that it has identified the particular frame $31(y_1+M)$ in the audio information stream that it is receiving from the audio information source 17, that corresponds to the frame $31(x_1+M)$ received from the handing-off zone player 11(n). As a result, the handed-off zone player 11(n') can also assume with a correspondingly high degree of confidence that the succeeding frames $31(y_1+M+1)$, $31(y_1+M+2)$, ... from the audio information source 17 will correspond to the frames $31(x_1+M+1)$, $31(x_1+M+2)$, ... that the handing-off zone player 11(n) will provide or may provide to the synchrony group 20, including the handed-off zone player 11(n'). Accordingly, the handed-off zone player 11(n') can presume that the rendering timing information $33(x_1+M)$ that it receives from the handing-off zone player 11(n) will also be the appropriate rendering timing information $33(y_1+M)$ that should be associated with the frame $31(y_1+M)$ that it received from the audio information source 17. Furthermore, since the time differential "δT" for the rendering timing information between two successive frames is a constant, the handed-off zone player 11(n') can readily determine the appropriate rendering timing information $33(y_1+M+f)$ for the "f-th" frame $31(y_1+M+f)$ following frame $33(y_1+M)$ as the rendering timing information $33(y_1+M)+(f*\delta T)$, where "*" refers to the multiplication operation. Thus, after the handed off zone player 11(n') has determined the can begin transmitting audio information frames $31(y_1+M+1)$, $31(y_1+M+2)$, ... and associated rendering timing information to the synchrony group 20.

The handed-off zone player 11(n')'s search for a series of frames $31(y_1)$, $31(y_1+1)$, ... in the audio information stream from the audio information source 17 that corresponds to series of frames $31(x_1)$, $31(x_1+1)$, ... from the handing-off zone player 11(n) is facilitated by the fact that the handed-off zone player 11(n') will buffer at least the frames $31(x_1)$, $31(x_1+1)$, ..., along with the rendering timing information $33(x_1)$, $33(x_1+1)$, ... that it receives from the handing-off zone player 11(n), as well as at least the frame checksum values $34(x_1)$, $34(x_1+1)$, .... The handed-off zone player 11(n') need only buffer the frames $31(x_1)$, $31(x_1+1)$, .... at least until the handed-off zone player 11(n') has rendered the audio information represented by the buffered frames, at which point it can erase the frames from the buffer. The handed-off zone player 11(n') may, but need not, also erase the rendering timing information $33(x_1)$, $33(x_1+1)$, .... associated with the erased frames $31(x_1)$, $31(x_1+1)$, ... when it erases the frames; alternatively, the handed-off zone player 11(n') may keep the associated rendering timing information $33(x_1)$, $33(x_1+1)$, ... until at least the end of the handoff operation, since it may find it useful to use at least one item of the rendering timing information $33(x_1)$, $33(x_1+1)$, ... in determining the appropriate rendering timing information $33(y_1)$, $33(y_1+1)$, ... for the frames $31(y_1)$, $31(y_1+1)$, ... from the audio information source 17.

It will be appreciated that both the zone player operating as the audio information channel device 23 may both (i) buffer a number frames 31(n) comprising the audio information stream 30 prior to transmitting them to the members 21, 22(g) of the synchrony group 20, and also (ii) when it generates rendering timing information 33(n) for transmission with the respective frames 31(n) to the members 21, 22(g) of the synchrony group 20, generate the rendering timing information 33(n) so as to provide for a delay in rendering by the members 21, 22(g) of the synchrony group 20 after they receive the frames 31(n) from the audio information channel device 23 over the network 12. It will be appreciated that, with respect to both (i) and (ii), the zone players that operate as the audio information channel device 23 and the respective members 21, 22(g) will buffer the frames 31(n) and any associated rendering timing information 33(n) in their respective buffers (not separately shown). In addition, if the zone player operating as the audio information channel device 23 is, as handing-off zone player 11(n), providing frame checksum values 34(n) for transmission to at least the handed-off zone player 11(n'), the frame checksum values 34(n) can also be buffered.

In the following, for clarity, for the reference numerals that are used in connection with audio information stream, individual frames, and rendering timing information that the handed-off zone player 11(n') receives from the handing-off zone player 11(n) and that it buffers during a handoff, a superscript "C" will be appended to indicate that they were provided by the handing-off zone player 11(n), which is operating as the audio information channel device 23 for the synchrony group. (The superscript "C" refers to "channel," as in "audio information channel device.") In addition, a superscript "C" will be added to the reference numeral associated with the frame checksum values that the handed-off zone player 11(n') that it generates and buffers for the frames received from the handing-off zone player 11(n). In connection with the reference numerals that are used in connection with the frames and the rendering timing information that the handed-off zone player 11(n') receives from the handing-off zone player 11(n) and buffers during a handoff operation, and the frame checksum values that the handed-off zone player 11(n') generates and buffers for the frames that it receives from the handing-off zone player 11(n), an unsubscripted index "x" will be generally used, whereas a subscripted index such as "$x_1$," "$x_2$", etc., will be used to indicate that specific ones of the frames, along with associated rendering timing information and frame checksum values.

Similarly with the audio information stream, individual frames, rendering timing information and the frame checksum values associated with the audio information stream from the audio information source 17, except that a superscript "S" will be appended to the respective reference numerals to indicate that they were provided by or generated for the audio information stream from the audio information source 17. (The superscript "S" refers to "source," as in "audio information source".). In connection with reference numerals that are used in connection with the frames that handed-off zone player 11(n') receives from the handing-off zone player 11(n) and buffers during a handoff operation, and the frame checksum values and the rendering timing information that the handed-off zone player 11(n') generates and buffers for the frames that it receives from the handing-off zone player 11(n), an unsubscripted index "y" will be generally used, whereas a subscripted index such as "$y_1$," "$y_2$", etc., will be used to indicate that specific ones of the frames, along with associated rendering timing information and frame checksum values.

Figure 4:
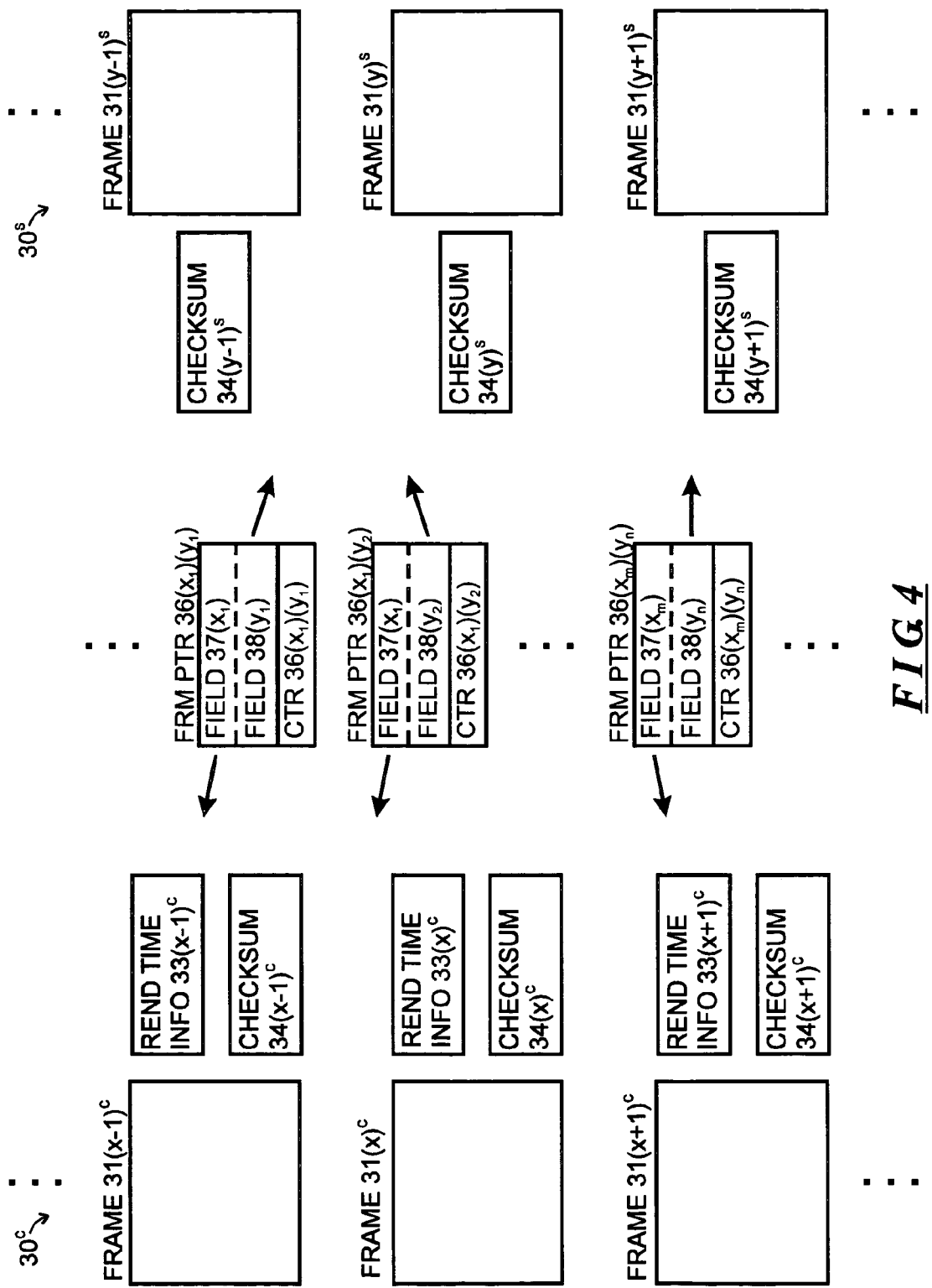
FIG. 4 depicts data structures used by a zone player in connection with operations performed in connection with the invention.

This will be illustrated with reference to FIG. 4. FIG. 4 depicts various data structures that the handed-off zone player 11(n') makes use of and generates in connection with a hand off operation. With reference to FIG. 4, the leftmost column of that FIG. depicts an audio information stream $30^C$ comprising a series of frames $31(x)^C$ that are received and buffered by the handed-off zone player 11(n') at least during the handoff operation. The leftmost column of that FIG. depicts an audio information stream $30^C$ comprising a series of frames . . . , $31(x-1)^C$, $31(x)^C$, $31(x+1)^C$, . . . that are received by the handed-off zone player $11(n')$ and that may be buffered by it during the handoff operation. In addition, associated with the series of frames . . , $31(x-1)^C$, $31(x)^C$, $31(x+1)^C$, . . . comprising the audio information stream $30^C$ from the handing-off zone player $11(n)$ are respective items of rendering time information . . . , $33(x-1)^C$, $33(x)^C$, $33(x+1)^C$, . . . that the handed-off zone player $11(n')$ receives from the handing-off zone player $11(n)$ and frame checksum values . . , $34(x-1)^C$, $34(x)^C$, $34(x+1)^C$, . . . that it (that is, the handed-off zone player $11(n')$) generates for the respective frames . . , $31(x-1)^C$, $31(x)^C$, $31(x+1)^C$, . . .

The rightmost column of FIG. 4 depicts an audio information stream $30^S$ comprising a series of frames that FIG. depicts an audio information stream $30^C$ comprising a series of frames . . . , $31(y-1)^S$, $31(x)^S$, $31(y+1)^S$, . . . that are received by the audio information source 17 and that may be buffered by it during the handoff operation; it will be appreciated, however, that the handed-off zone player $11(n')$ need not buffer the frames that it receives from the audio information source 17 until it is in a condition to supply audio and rendering timing information to the synchrony group 20. Associated with the series of frames . . . , $31(y-1)^S$, $31(y)^S$, $31(y+1)^S$, . . . comprising the audio information stream $30^S$ from the audio information source are frame checksum values . . . , $34(x+1)^C$, $34(x)^C$, $34(x+1)^C$, . . . that it (that is, the handed-off zone player $11(n')$) generates for the respective frames . . . , $31(x-1)^C$, $31(x)^C$, $31(x+1)^C$, . . . . The handed-off zone player $11(n')$ will generate rendering timing information (not shown in FIG. 4) to be associated with the respective frames comprising the audio information stream $30^S$ after it has determined that particular frames in the audio information stream $30^S$ from the audio information source 17 correspond to particular frames in the audio information stream $30^C$ from the handing-off zone player $11(n)$.

In addition to the audio information streams $30^C$ and $30^S$, frames . . . , $31(x-1)^C$, $31(x)^C$, $31(x+1)^C$, . . . and . . . , $31(y-1)^S$, $31(y)^S$, $31(y+1)^S$, . . . , rendering information $31(x+1)^C$, . . . and frame check values . . . , $34(x-1)^C$, $34(x)^C$, $34(x+1)^C$, . . . and . . . , $34(y-1)^S$, $34(y)^S$, $34(y+1)^S$, . . . . FIG. 4 also depicts several other data structures that the handed-off zone player $11(n')$ can use to identify the particular frame in the audio information stream $30^S$ from the audio information source 17 that corresponds to the frame in the audio information stream $30^C$ from the handing-off zone player $11(n)$. In particular, the handed-off zone player $11(n')$ also makes use of one or more frame pointers . . . , $35(x_1)(y_1)$, $35(x_2)(y_2)$, . . . , $35(x_m)(y_n)$, . . . and associated counters . . . , $36(x_1)(y_1)$, $36(x_2)(y_2)$, . . . , $36(x_m)(y_n)$, . . . . Each frame pointer, for example, frame pointer $35(x_1)(y_1)$, comprises two fields, namely a field $37(x_1)$ and a field $38(y_1)$. The field $37(x_1)$ contains a pointer that points to a particular buffer location in which information associated with a frame received from the handing-off zone player $11(n)$ is stored. On the other hand, the field $38(y_1)$ contains a pointer that points to a particular buffer location associated with a frame received from the audio information source 17 is stored. It will be appreciated that the buffer locations pointed to by the pointers in the respective fields may store the respective frames, the frame checksum values generated for the respective frames, or any other information associated with the respective frames or frame checksum values as will be appreciated by those skilled in the art. In the following, it will be assumed that the pointers in fields $37(x_1)$, $38(y_1)$ point to the buffer locations in which the frame checksum values are stored.

As will be described below in greater detail, the handed-off zone player $11(n')$ uses the frame pointers . . . , $35(x_1)(y_1)$, $35(x_2)(y_2)$, . . . , $35(x_m)(y_n)$, . . . to keep track of sequences of frames received from the handing-off zone player $11(n)$ and the audio information source 17 whose frame check values correspond with one another. The handed-off zone player $11(n')$ uses the counters . . . , $36(x_1)(y_1)$, $36(x_2)(y_2)$, . . . , $36(x_m)(y_n)$, . . . that are associated with the respective pointers to determine when it received sufficient numbers of frames from the handing-off zone player $11(n)$ and the audio information source 17 for it to determine that a frame, such as frame $31(x_m)^C$ that it received from the handing-off zone player $11(n)$, corresponds to a frame, such as frame $31(y_n)^S$ that it received from the audio information source 17. The counters . . . , $36(x_1)(y_1)$, $36(x_2)(y_2)$, . . . , $36(x_m)(y_n)$, . . . indicate the number of successive frames that have been identified in the respective sequences.

Operations performed by the handed-off zone player $11(n')$ in connection with identifying a particular frame sequence $31(x_1)^C$, $31(x_1+1)^C$, . . . from the handing-off zone player $11(n)$ that corresponds to a frame sequence $31(y_1)^S$, $31(y_1+1)^S$, . . . from the audio information source 17 will initially be illustrated by an example. Suppose, for example, that the handed-off zone player $11(n')$ is in a condition in which it has determined that none the frame checksum values $34(x)^C$ associated with none of the frames $31(x)^C$ from the handing-off zone player $11(n)$ that it is buffering correspond to the frame checksum values $34(y)^S$ associated with the frames that it has received from the audio information source 17. This maybe the case if, for example, the handoff operation has only recently begun, although will be appreciated that it can also occur at other times during the handoff operation. Suppose further that the handed-off zone player $11(n')$ receives a frame $31(x_1)^C$ from the handing-off zone player $11(n)$, generates a frame checksum value $34(x_1)^C$ therefor, compares the frame checksum value $34(x_1)^C$ to the frame checksum values $34(y)^S$ that it has generated and buffered for the frames $31(y)^S$ that it previously received from the audio information source 17, and that it determines that the frame checksum value $34(x_1)^C$ corresponds to the frame checksum value $34(y_1)^S$ generated for a frame $31(y_1)^S$ that it had received from the audio information source 17. In that case, the handed-off zone player $11(n')$ will establish a frame pointer $35(x_1)(y_1)$ that includes two-fields $37(x_1)$ and $37(x_2)$. Field $37(x_1)$ points to a buffer location that is associated with the location in which the frame checksum value $34(x_1)^C$ generated for frame $31(x_1)^C$ received from the handing-off zone player $11(n)$ is stored. Field $38(y_1)$ points to a buffer location that is associated with the location in which the frame checksum value $34(y_1)^S$ generated for the frame $31(y_1)^S$ from the audio information source 17 is stored. As will be made clear below, in one particular embodiment, it is convenient for the pointer in the field $37(x_1)$ to actually point to the buffer location in which the frame checksum value $34(x_1+1)^C$ will be stored after the next frame $31(x_1+1)^C$ has been received from the handing off zone player $11(n)$. Similarly, it is convenient for the field $38(y_1)$ to the buffer location in which the frame checksum value $34(y_1+1)^S$ associated with the frame $31(y_1+1)^S$ is or will be stored.

In addition to the frame pointer $35(x_1)(y_1)$, the handed-off zone player $11(n')$ will also establish and initialize a counter $36(x_1)(y_1)$ that can be associated with the frame pointer $35(x_1)(y_1)$. As noted above, the counter $36(x_1)(y_1)$ will be used to keep track of the number of sequential frames $31(x_1)^C$, $31(x_1+1)^C$, . . . received from the handing-off zone player $11(n)$ have frame checksum values $34(x_1)^C$, $34(x_1+1)^C$, . . . that correspond to frame checksum values $34(y_1)^S$, $34(y_1+1)^S$, . . . associated with frames $31(y_1)^S$, $31(y_1+1)^S$, . . . received from the audio information source 17. More specifically, the counter $36(x_1)(y_1)$ will be used to determine if and when the required number of sequential "M+1" correspondences have been located as between the series of checksum values $34(x_1)^C \ldots 34(x_1+M)^C$ associated with frames $31(x_1)^C \ldots 31(x_1+M)^C$ received from the handing-off zone player $11(n)$ and the series of checksum values $34(y_1)^S \ldots 34(y_1+M)^S$ associated with frames $31(y_1)^S \ldots 31(y_1+M)^S$ received from the audio information source 17. If the value of the counter $36(x_1)(y_1)$ reaches "M+1," the handed-off zone player $11(n')$ may be in a position to determine that the frame $31(x_1+M)^C$ from the handing-off zone player $11(n)$ is a likely candidate to correspond to the frame $31(y_1+M)^S$ from the audio information source 17. A problem may arise if the value of two counters reaches "M+1" simultaneously, which will be addressed below.

Continuing with the above example, if the handed-off zone player $11(n')$, after it receives the frame $31(x_1)^C$ from the handing-off zone player $11(n)$ and generates the frame checksum value $34(x_1)^C$ therefor, determines that the frame checksum value $34(x_1)^C$ corresponds to two or more frame checksum values $34(y_1)^S$, $34(y_2)^S$, ... generated for respective frames $31(y_1)^S$, $31(y_2)^S$, ... received from the audio information source 17, it will establish a frame pointer $35(x_1)(y_1)$, $35(x_1)(y_2)$, and initialize a counter $36(x_1)(y_1)$, $36(x_2)(y_2)$ associated with each of the frame checksum values $34(y_1)^S$, $34(y_2)^S$, ..., that corresponded to frame checksum value $34(x_1)^C$.

It will be appreciated that the handed-off zone player $11(n')$ will perform similar operations if it is in a condition in which it has determined that none the frame checksum values $34(x)^C$ associated with none of the frames $31(x)^C$ from the handing-off zone player $11(n)$ that it is buffering correspond to the frame checksum values $34(y)^S$ associated with the frames that it has received from the audio information source 17, and it determines that a frame $31(y_1)^S$ from audio information source 17 corresponds to the frame checksum value(s) $34(x_1)^C$, $34(x_2)^C$, ... generated for corresponding frame(s) $31(x_1)^C$, $31(x_2)^C$, ... that it had received from the handing-off zone player $11(n)$. In either case, the handed-off zone player will have one or more frame pointers $35(x_1)(y_1)$, $35(x_1)(y_2)$, ... or $35(x_1)(y_1)$, $35(x_2)(y_1)$, ..., and associated counters $36(x_1)(y_1)$, $36(x_1)(y_2)$, ... or $36(x_1)(y_1)$, $36(x_2)(y_1)$, ... therefor.

Continuing with the above example, suppose that the handed-off zone player $11(n')$ receives a frame $31(x_1+1)^C$ from the handing-off zone player $11(n)$. Suppose further that it has previously determined that a frame checksum value $34(x_1)^C$ associated with a frame $31(x_1)^C$ from the handing off zone player $11(n)$ corresponds to frame checksum values $34(y_1)^S$ and $34(y_2)^S$ associated with respective frames $31(y_1)^S$ and $31(y_2)^S$ from the audio information source 17. In that case, when the handed-off zone player $11(n')$ receives the frame $31(x_1+1)^C$, it (that is, the handed-off zone player $11(n')$) will have already established respective frame pointers $35(x_1)(y_1)$, $35(x_1)(y_2)$, and respective counters $36(x_1)(y_1)$, $36(x_1)(y_2)$. In that case, several scenarios can occur, including:

(i) in connection with the frames $31(y_1+1)^S$, $31(Y_2+1)^S$ that have been or will be received from the audio information source 17 and that are associated with frame pointers $35(x_1)(y_1)$, $35(x_1)(y_2)$ and associated counters $36(x_1)(y_1)$, $36(x_1)(y_2)$:

A. the handed-off zone player $11(n')$ has not yet received one of the frames, such as frame $31(y_2+1)^S$ (it will be appreciated that the handed-off zone player $11(n')$ will have received at least one of the frames, such as frame $31(y_1+1)^S$, but it may not have yet received the other frame, such as frame $31(y_2+1)^S$) and the frame checksum value $34(x_1+1)^C$ generated for frame $31(x_1+1)^C$ does not correspond to the frame checksum value $34(y_1+1)^S$ generated for frame $31(y_1+1)^S$;

B. the handed-off zone player $11(n')$ has not yet received one of the frames, such as frame $31(y_2+1)^S$ and the frame checksum value $34(x_1+1)^C$ generated for frame $31(x_1+1)^C$ does correspond to the frame checksum value $34(y_1+1)^S$ generated for frame $31(y_1+1)^S$;

C. the handed-off zone player $11(n')$ received both of the frames $31(y_1+1)^S$ and $31(y_2+1)^S$, and the frame checksum value $34(x_1+1)^C$ corresponds to the frame checksum value $34(y_1+1)^S$, but the frame checksum value $34(x_1+1)^C$ does not correspond to the frame checksum value $34(y_2+1)^S$;

D. the handed-off zone player $11(n')$ received both of the frames $31(y_1+1)^S$ and $31(y_2+1)^S$, and the frame checksum value $34(x_1+1)^C$ does not correspond to the frame checksum value $31(y_1+1)^S$, but the frame checksum value $34(x_1+1)^C$ does correspond to the frame checksum value $34(x_1+1)^S$;

E. the handed-off zone player $11(n')$ received both of the frames $31(y_1+1)^S$ and $31(y_2+1)^S$, and the frame checksum value $34(x_1+1)^C$ corresponds to both frame checksum values $31(y_1+1)^S$ and $34(y_2+1)^S$; and F. the handed-off zone player $11(n')$ received both of the frames $31(y_1+1)^S$ and $31(y_2+1)^S$, and the frame checksum value $34(x_1+1)^C$ corresponds to neither frame checksum values $31(y_1+1)^S$ nor $34(y_2+1)^S$; and (ii) in connection with other frames $31(y_3)^S$, $31(y_4)^S$, ... that the handed-off zone player $11(n')$ has received from the audio information source 17, and that are not associated with a respective frame pointer or associated counter, A. the frame checksum value $34(x_1+1)^C$ does not correspond to the frame checksum value $34(y_3)^S$, $34(y_4)^S$, ... generated for any of the frames $31(y_3)^S$, $31(y_4)^S$ that are not associated with a respective frame pointer or associated counter; and B. the frame checksum value $34(x_1+1)^C$ does correspond to the frame checksum value $34(y_3)^S$, $34(y_4)^S$, ... generated for one or more of the frames $31(y_3)^S$, $31(y_4)^S$ that are not associated with a respective frame pointer or associated counter It will be appreciated that, as between the scenarios in category (i) and (ii) above, the scenarios are not necessarily mutually exclusive. For example, the frame checksum value $34(x_1+1)^C$ generated for frame $31(x_1+1)^C$ received from the handing-off zone player $11(n)$ can correspond to the frame checksum values for frames $31(y_1+1)^S$ and $31(y_2+1)^S$ associated with existing frame pointers $35(x_1)(y_1)$ and $35(x_1)(y_2)$ (reference item (i)(D) above), and can also correspond to the frame checksum value $34(y_3)^S$ generated for another frame $31(y_3)^S$ that is not associated with an existing frame pointer or counter (reference item (ii)(B) above).

Examining the scenarios in more detail, and beginning with the scenarios in category (ii), if the handed-off zone player $11(n')$ determines that the frame checksum value $34(x_1+1)^C$ generated for the frame $31(x_1+1)^C$ corresponds to the frame checksum value $34(y_3)^S$, $34(y_4)^S$, ... generated for one or more of the frames $31(y_3)^S$, $31(y_4)^S$, ... for that are not currently associated with respective frame pointers and associated counters (reference scenario (ii)(B) above), it can establish a frame pointer $35(x_1+1)(y_3)$, $35(x_1+1)(y_4)$, ... and associated counter $36(x_1+1)(y_3)$, $36(x_1+1)(y_4)$, ... therefor. It will be appreciated that, in establishing the frame pointer $35(x_1+1)(y_3)$, the handed-off zone player $11(n')$ will provide a pointer in the field $37(x_1+1)$ that points to the location in which the frame checksum value $34(x_1+2)^C$ generated for the next frame $31(x_1+2)^C$ from the handing-off zone player $11(n)$ will be stored, and a pointer in the field $38(y_3)$ that points to the location in which the frame checksum value $34(y_3+1)^S$ generated for the frame $31(y_3+1)^S$, is or will be stored. Similarly, in establishing the frame pointer $35(x_1+1)(y_4)$, the handed-off zone player $11(n')$ will provide a pointer in the field $37(x_1+1)$ that points to the location in which the frame checksum value $34(x_1+2)^C$ generated for the next frame $31(x_1+2)^C$ from the handing-off zone player $11(n)$ will be stored, and a pointer in the field $38(y_4)$ that points to the location in which the frame checksum value $34(y_4+1)^S$ generated for the frame $31(y_4+1)^S$, is or will be stored On the other had, if the handed-off zone player $11(n')$ determines that the frame checksum value $34(x_1+1)^C$ does not correspond to the frame checksum value $34(y_3)^S$, $34(y_4)^S$, . . . generated for any of the other frames $31(y_3)^S$, $34(y_4)^S$, . . . (reference scenario (ii)(A) above) there are no operations for it to perform in response to such a scenario.

With reference to the scenarios in category (i), if the handed-off zone player $11(n')$ determines that it has not yet received one of the frames, such as frame $31(y_2+1)^S$ (it will be appreciated that the handed-off zone player $11(n')$ will have received at least one of the frames, such as frame $31(y_1+1)^S$) and the frame checksum value $34(x_1+1)^C$ generated for frame $31(x_1+1)^C$ does not correspond to the frame checksum value $34(y_1+1)^S$ generated for frame $31(y_1+1)^S$ (reference scenario (i)(A) above), it will perform operations in connection with the frame pointer $35(x_1)(y_1)$ and associated counter $36(x_1)(y_1)$ that are associated with the frame $31(y_1)^S$ that it has received, but not in connection with the frame pointer $35(x_1)(y_2)$ and associated counter $36(x_1)(y_2)$ that are associated with the frame $31(y_2+1)^S$ that it has not received. Since, in this scenario, the handed-off zone player $11(n')$ determines that the frame checksum value $34(x_1+1)$ generated for frame $31(x_1+1)^C$ does not correspond to the frame checksum value $34(y_1+1)$ generated for the frame $31(y_1+1)^S$, the handed-off zone player $11(n')$ will eliminate the frame pointer $35(x_1)(y_1)$ and associated counter $36(x_1)(y_1)$.

Continuing with the scenarios in category (i), if the handed-off zone player $11(n')$ has also not yet received one of the frames, such as frame $31(y_2+1)^S$ and if it determines that the frame checksum value $34(x_1+1)^C$ generated for frame $31(x_1+1)^C$ does correspond to the frame checksum value $34(y_1+1)^S$ generated for frame $31(y_1+1)^S$ (reference scenario (i)(B) above), it will also perform operations in connection with the frame pointer $35(x_1)(y_1)$ and associated counter $36(x_1)(y_1)$ that are associated with the frame $31(y_1)^S$ that it has received, but not in connection with the frame pointer $35(x_1)(y_2)$ and associated counter $36(x_1)(y_2)$ that are associated with the frame $31(y_2+1)^S$ that it has not received. In this case, since the handed-off zone player $11(n')$ determined that the frame checksum value $34(x_1+1)^C$ corresponds to the frame checksum value $34(y_1+1)^S$, it will update the frame pointer $35(x_1)(y_1)$ and counter $36(x_1)(y_1)$. In updating the frame pointer $35(x_1)(y_1)$, the handed-off zone player $11(n')$ will update field $37(x_1)$ to point to the buffer location in which the next frame $31(x_1+2)^C$ received from the handing-off zone player $11(n)$ is or will be stored, and the field $38(y_1)$ to point to the buffer location in which the frame checksum value $34(y_1+2)^S$ generated for the next frame $31(y_1+2)^S$ received from the audio information source $17$ will be buffered. The handed-off zone player $11(n')$ can update the counter $36(x_1)(y_1)$ by incrementing the counter.

Further continuing with the scenarios in category (i), if the handed-off zone player $11(n')$ received both of the frames $31(y_1+1)^S$ and $31(y_2+1)^S$, and if it determines that the frame checksum value $34(x_1+1)^C$ corresponds to the frame check-sum value of one of the frames, illustratively, frame $31(y_1+1)^S$, but not the other, illustratively, frame $31(y_2+1)^S$ (reference scenarios (i)(C) and (i)(D) above), it can update the frame pointer $35(x_1)(y_1)$ and counter $36(x_1)(y_1)$ that is associated with the frame for which the frame checksum value corresponds, and eliminate the pointer $35(x_1)(y_2)$ and counter $36(x_1)(y_2)$ that is associated with the frame for which the frame checksum value does not correspond. As with operations described above in connection with scenario (i)(B), in updating the frame pointer $35(x_1)(y_1)$, the handed-off zone player $11(n')$ will update field $37(x_1)$ to point to the buffer location in which the next frame $31(x_1+2)^C$ received from the handing-off zone player $11(n)$ is or will be stored, and the field $38(y_1)$ to point to the buffer location in which the frame checksum value $34(y_1+2)^S$ generated for the next frame $31(y_1+2)^S$ received from the audio information source $17$ will be buffered. The handed-off zone player $11(n')$ can update the counter $36(x_1)(y_1)$ by incrementing the counter.

Further continuing with the scenarios in category (i), if the handed-off zone player $11(n')$ received both of the frames $31(y_1+1)^S$ and $31(y_2+1)^S$, and the frame checksum value $34(x_1+1)^C$ corresponds to both frame checksum values $31(y_1+1)^S$ and $34(y_2+1)^S$ (reference scenario (i)(E) above) it can update the pointer and counter that is associated with both of the frames. As with operations described above in connection with scenarios (i)(B) and (i)(C), in updating the frame pointers $35(x_1)(y_1)$ and $35(x_1)(y_2)$, the handed-off zone player $11(n')$ will update field $37(x_1)$ of each frame pointer to point to the buffer location in which the next frame $31(x_1+2)^C$ received from the handing-off zone player $11(n)$ is or will be stored. In addition, the handed-off zone player $11(n')$ will update the field $38(y_1)$ of frame pointer $35(x_1)(y_1)$ to point to the buffer location in which the frame checksum value $34(y_1+2)^S$ generated for the next frame $31(y_1+2)^S$ received from the audio information source $17$ will be buffered, and the field $38(y_2)$ of frame pointer $35(x_1)(y_2)$ to point to the buffer location in which the frame checksum value $34(y_2+2)^S$ generated for the next frame $31(y_2+2)^S$ received from the audio information source $17$ will be buffered. The handed-off zone player $11(n')$ can update both counters $36(x_1)(y_1)$ and $36(x_1)(y_2)$ by incrementing them.

Finally in connection with the scenarios in category (i), if the handed-off zone player $11(n')$ received both of the frames $31(y_1+1)^S$ and $31(y_2+1)^S$, and the frame checksum value $34(x_1+1)^C$ corresponds to neither frame checksum values $31(y_1+1)^S$ nor $34(y_2+1)^S$ (reference scenario (i)(F) above) it can eliminate the pointers $35(x_1)(y_1)$ and $35(x_1)(y_2)$ and counters $36(x_1)(y_1)$ and $36(x_1)(y_2)$ associated with both frames $31(y_1+1)^S$ and $31(y_2+1)^S$.

It will be appreciated that the scenarios in category (i) can be extended if, for example, the handed-off zone player $11(n')$ had previously determined that the frame checksum value $34(x_1)^C$ that it generated for frame $31(x_1)^C$ received from the handing-off zone player $11(n)$ corresponds to frame checksum values of more than two frames received from the audio information source $17$.

It will also be appreciated that the handed-off zone player $11(n')$ will also perform similar operations to those described above when it receives a frame $31(y)^S$ from the audio information source $17$. Thus, for example, referencing scenarios (i)(A) and (i)(B), in which the handed-off zone player $11(n')$ has received one frame $31(y_1+1)^S$ from the audio information source $17$, but not another frame $31(y_2+1)^S$, when the handed-off zone player $11(n')$ receives frame $31(y_2+1)^S$ from the audio information source $17$, it will generate the frame checksum value $34(y_2+1)^S$ therefor and determine whether that frame checksum value corresponds to the frame checksum value generated for any of the frames $31(x)^C$ that it had received from the handing-off zone player $11(n)$. If the handed-off zone player $11(n')$ determines that the frame checksum value $34(y_2+1)^S$ corresponds to the frame checksum value $34(x_1+1)^C$ it will update the frame pointer $35(x_1)(y_2)$ and increment the counter $36(x_1)(y_2)$. In updating the frame pointer $35(x_1)(y_2)$, the handed-off zone player $11(n')$ will update the field $37(x_1)$ to point to the buffer location in which frame $31(x_1+2)^C$ from the handing-off zone player $11(n)$ is or will be buffered, and the field $38(y_2$ to point to the buffer location in which the frame checksum value $34(y_2+2)^S$ from the audio information source $17$ is or will be buffered.

As noted above in connection with the scenarios described above, it will further be appreciated that, when the handed-off zone player $11(n')$ receives a frame from either the handing-off zone player $11(n)$ or the audio information source $17$, it can use the frame pointers to determine whether the frame is associated with a sequence of corresponding frame. This follows from the fact that, when a frame pointer, for example, frame pointer $35(x_1)(y_1)$ is established and when it is updated, the respective fields $37(x_1)$, $37(y_1)$ will point to the storage location in which the frame checksum value $34(x_1+1)^C$, $34(y_1+1)^S$ generated for the next frame $31(x_1+1)^C$, $31(y_1+1)^S$ will be stored, and similarly for each of successive frame of a sequence.

Returning to the above described scenarios, after the handed-off zone player $11(n')$ has updates a counter $36(x_1)(y_1)$ and/or $36(x_1)(y_2)$, it can determine whether the value of either or both of the counters corresponds to "M+1," which, as noted above, is the minimum value at which the handed-off zone player $11(n')$ will determine it has identified the frame(s) in the audio information stream $30^C$ that it is receiving from the handing-off zone player $11(n)$ corresponds to the frames(s) in the audio information stream $30^S$ that it is receiving from the audio information source $17$. If the handed-off zone player $11(n')$ determines that none of the counters has the value of "M+1," it will repeat the above-described operations through further iterations, as frames $31(x)_C$ and $31(y)_S$ are received from the handing-off zone player $11(n)$ and audio information source $17$, respectively. On the other hand, if the handed-off zone player $11(n')$ determines that, after a counter is updated, the value of the counter is "M+1," the handed-off zone player $11(n')$ can determine that the pair of frame sequences $31(x_m)^C$ and $31(y_n)^S$ that are pointed to by the frame pointer are likely to be the corresponding frames in the respective audio information streams $30^C$ and $30^S$ from the handing-off zone player $11(n)$ and audio information source $17$, at which point it can terminate operations in connection with locating the corresponding frames.

It will be appreciated that, the values of two or more counters reach "M+1" simultaneously, which can occur if, for example, the sequence of frame checksum values of two pairs of frame sequences, such as frame sequence $31(x_m)^C$ and $31(y_n)^S$ and frame sequence $31(x_m')^C$ and $31(y_n)^S$ have similar sequences of "M+1" frame checksum values. In that case, the handed-off zone player $11(n')$ can continue operations in connection with locating the corresponding frames until the values of the two counters $36(x_m)(y_n)$, $36(x_m')(y_n')$ differ, and at that point terminate operations and use the frame pointer associated with the frame sequence pair that is associated with the counter with the higher value to identify the corresponding frames in two audio information streams it is receiving from the handing-off zone player $11(n)$ and audio information source $17$.

Thus, using the frame pointers $35(x_m)(y_n)$ and the associated counters $36(x_m)(y_n)$, along with the series of buffered frame check values $34(x_m)^C \ldots 34(x_m+M)^C$, $34(y_n)^S \ldots$ $34(y_n+M)^S$ associated with the respective frames $31(x_m)^C \ldots$ $31(x_m+M)^C$, $31(y_n)^S \ldots 31(y_n+M)^S$, for any value of "m" and "n," comprising the audio information streams $30^C$, $30^S$ from the handing-off zone player $11(n)$ and the audio information source $17$, respectively, the handed-off zone player $1(n')$ can determine the corresponding frames as between the two audio information streams. Thereafter, the handed-off zone player $11(n')$ can use, for example, the rendering timing information $33(x_m+M)^C$ for frame $31(x_m+M)^C$ that it received from the handing-off zone player $11(n)$ to determine the appropriate rendering timing information $33(y_n)^S$ for the corresponding frame $31(y_n+M)^S$, as well as the appropriate rendering timing information for the subsequent frames $31(y_n+M+1)^S$, $31(y_n+M+2)^S$, ... that it can provide to the synchrony group $20$ for which it is to become the audio information channel device $23$. Accordingly, after the handed-off zone player $11(n')$ has determined the sequence of frames $31(y_n)^S$, $31(y_n+1)^S$, ... in the audio information stream from the audio information source $17$ that corresponds to the sequence of frame $31(x_m)^C$, $31(x_m+1)^C$, ... in the audio information stream from the handing-off zone player $11(n)$, it (the handed-off zone player $11(n')$) can proceed with notifying the members $21$, $22(g)$ of the synchrony group $20$ that it will be the audio information channel device $23$ for the synchrony group. After all of the members have migrated to the handed-off zone player $11(n')$ as the audio information channel device $23$, the handing-off zone player $11(n)$ can terminate operations as audio information channel device.

Figure 5A:
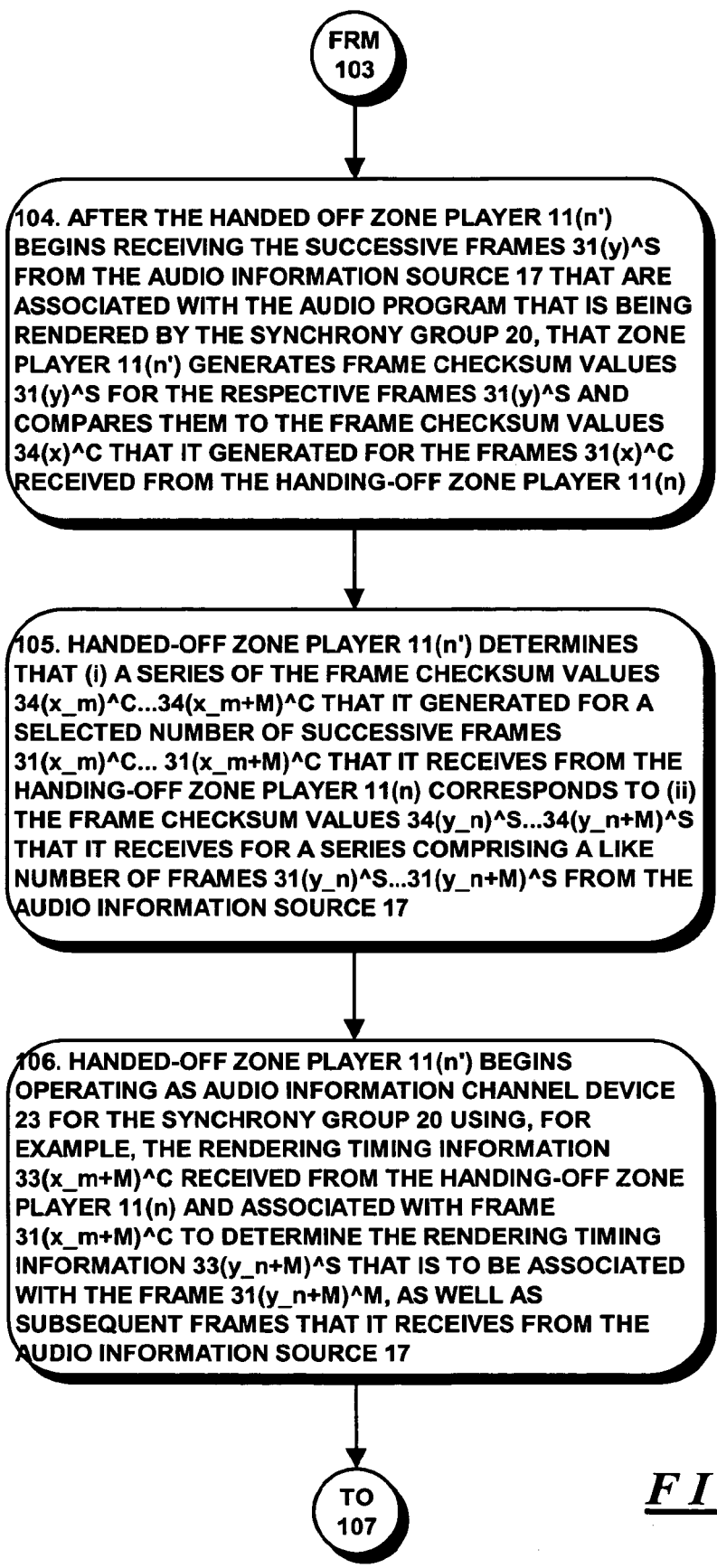
FIG. 5 is a flowchart depicting operations performed by zone players during a handoff from one "handing-off" zone player, that is currently supplying audio and rendering timing information to the synchrony group, to another "handed-off" zone player that is to subsequently supply audio and rendering timing information to the synchrony group.
Figure 6:
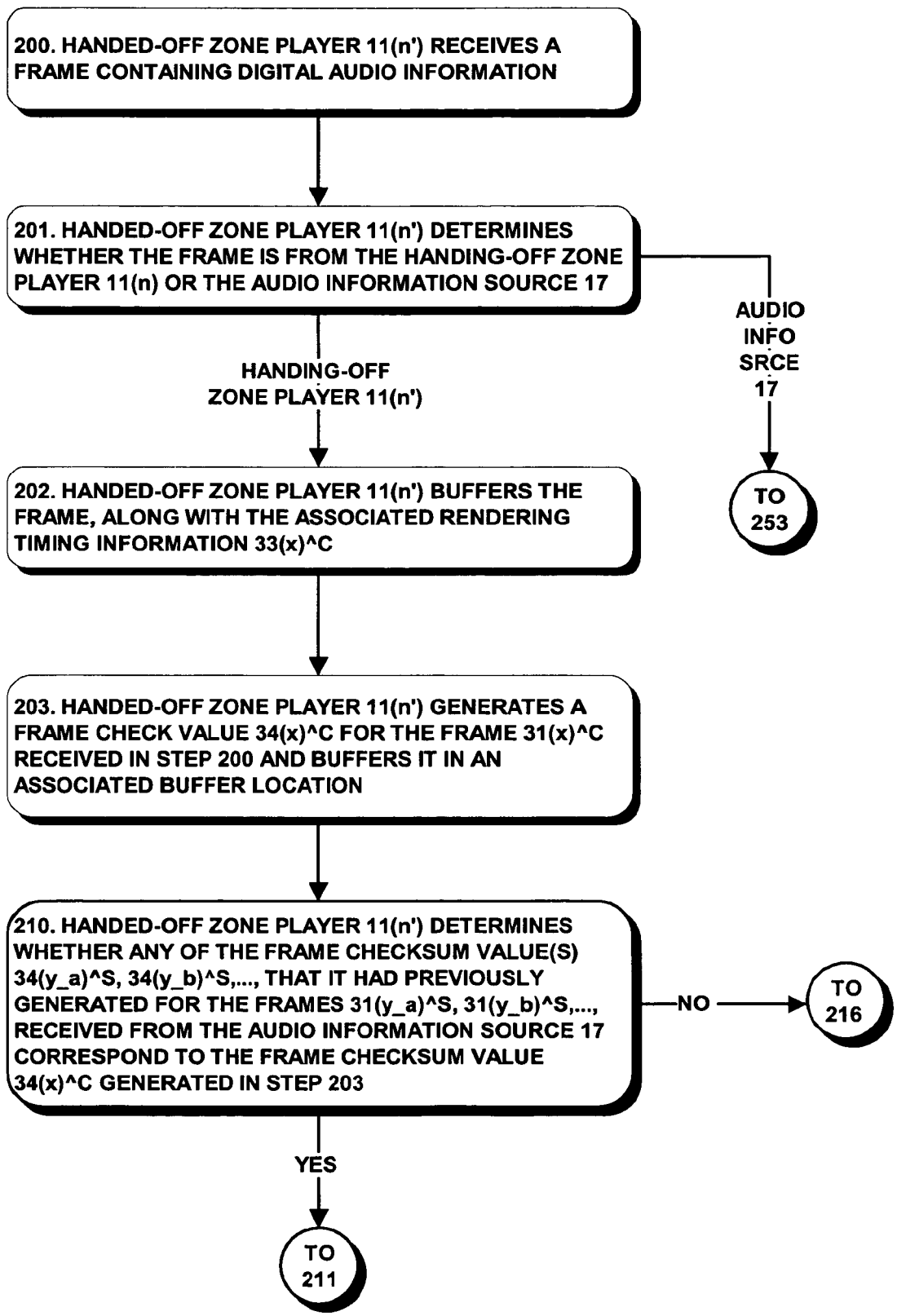
FIG. 6 is a flow chart that details operations performed by the handed-off zone player in connection with identifying corresponding portions of two audio information streams provided
Figure 6A:
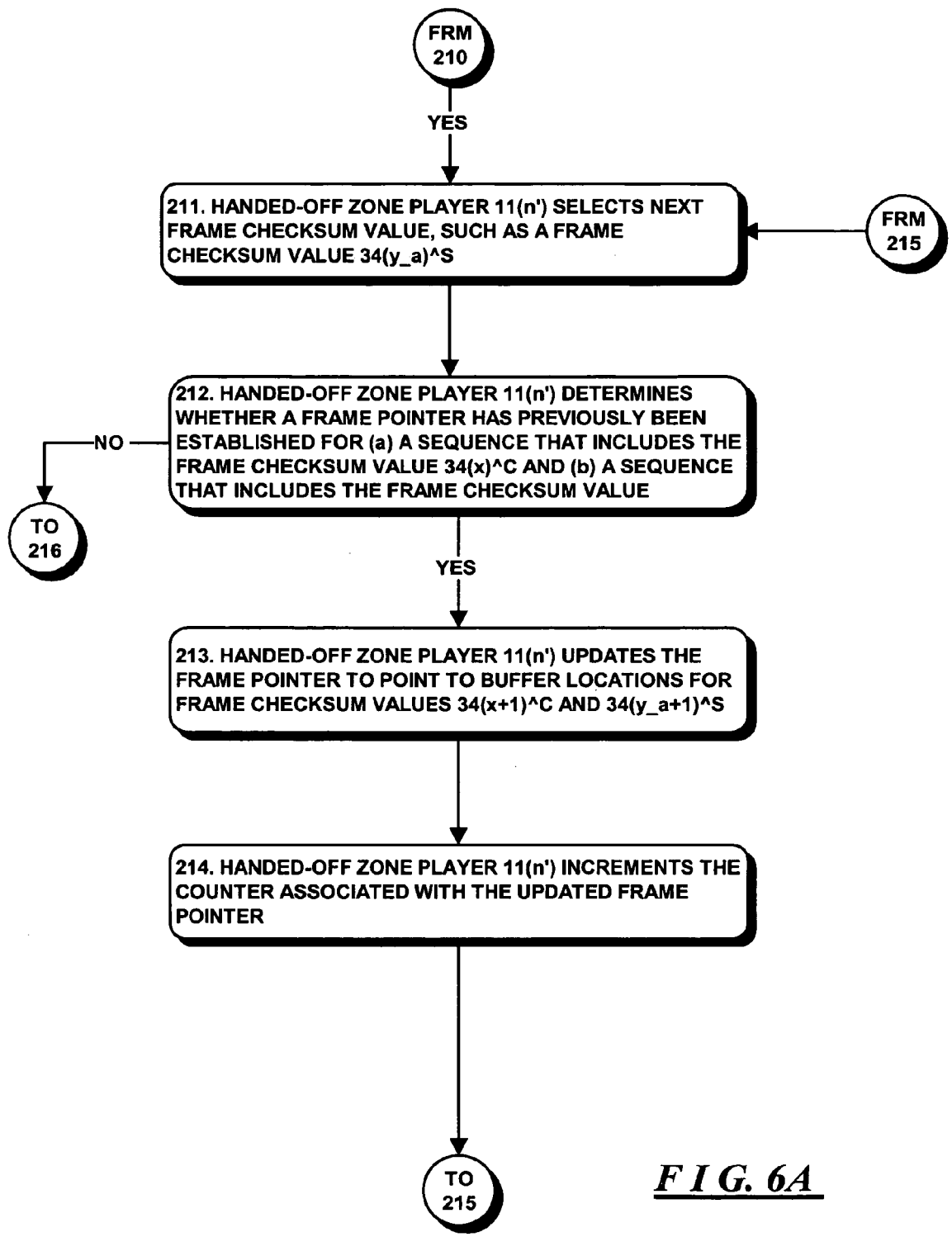
Figure 6B:
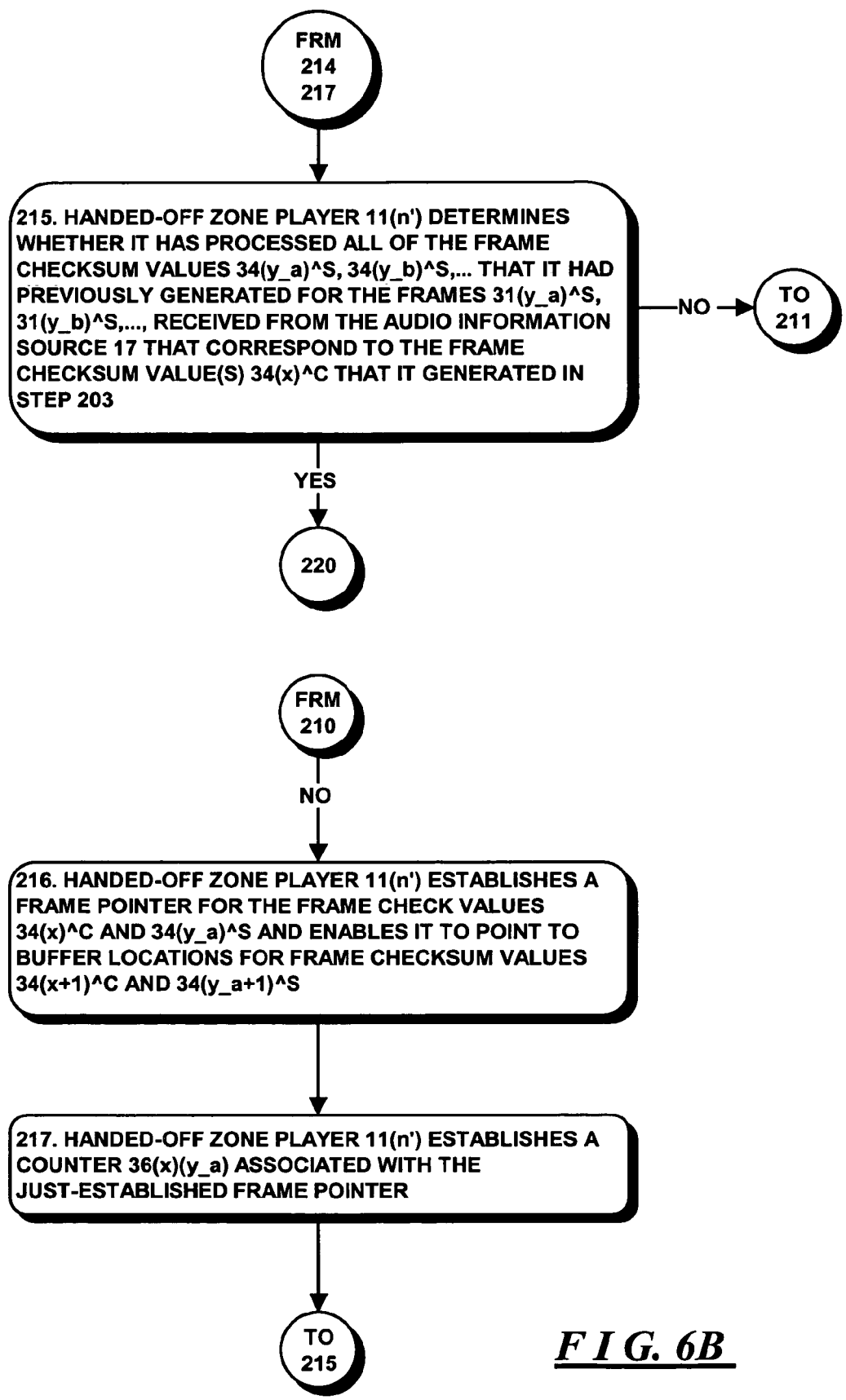
Figure 6C:
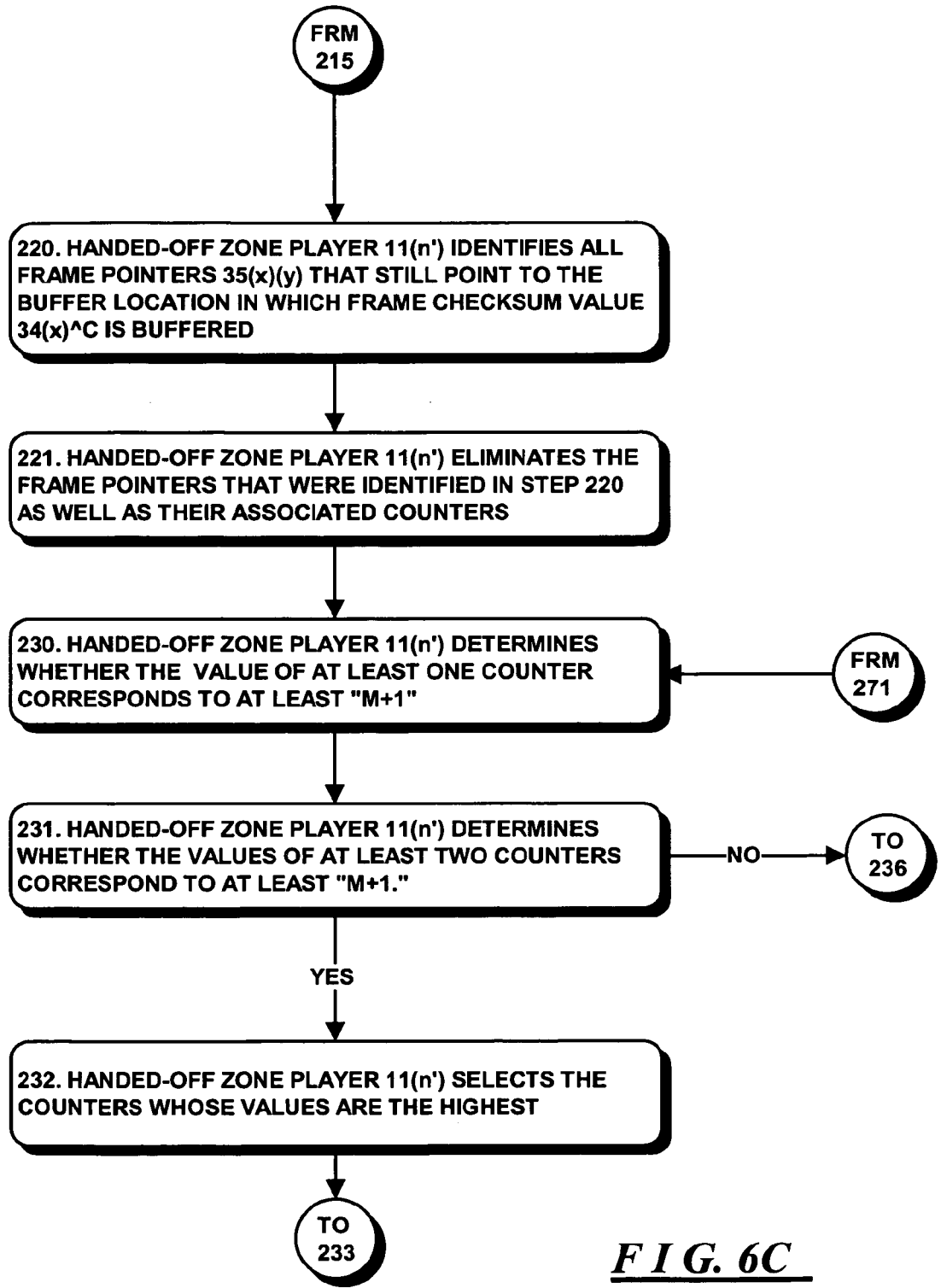
Figure 6E:
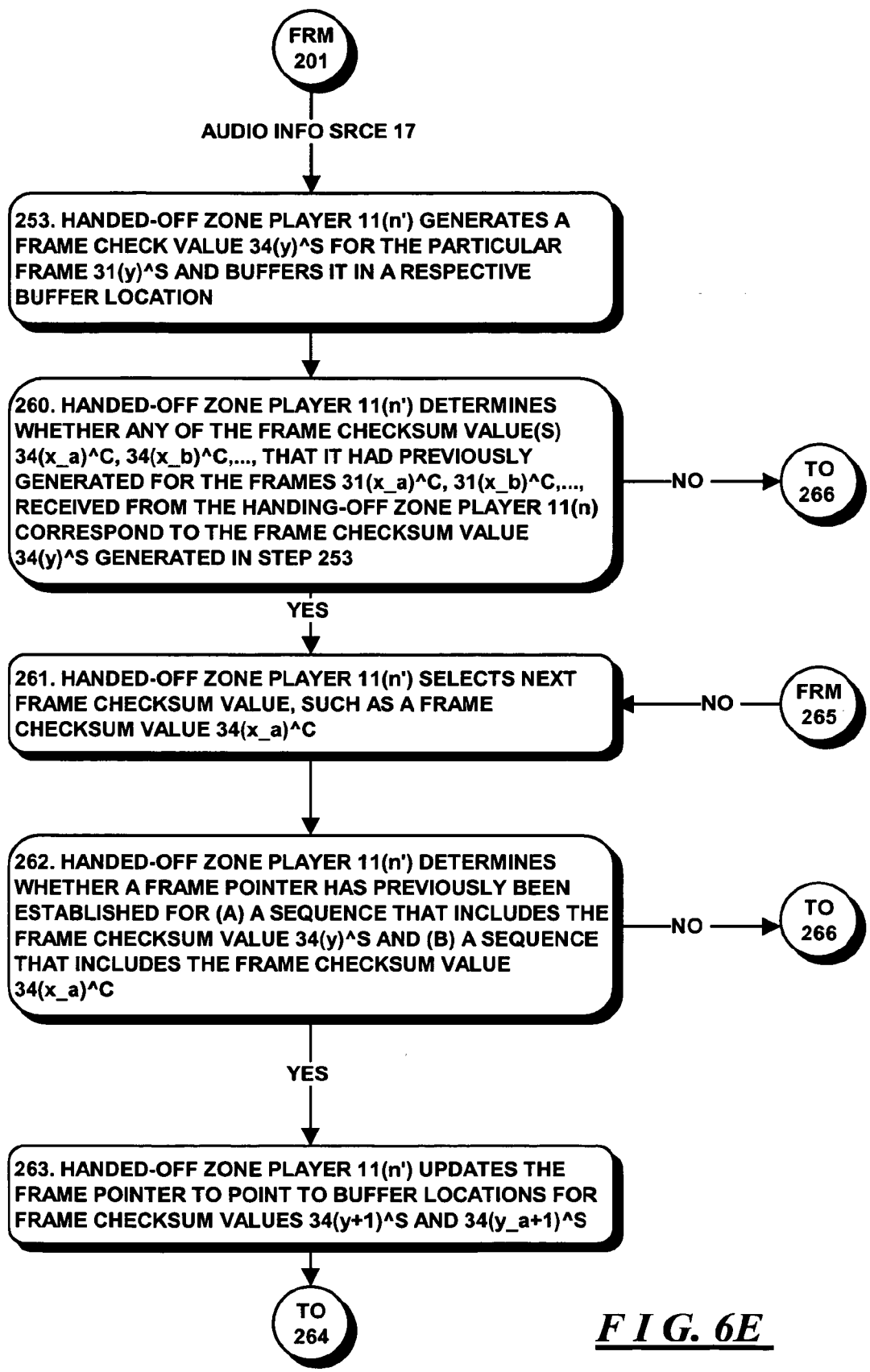
Figure 6G:
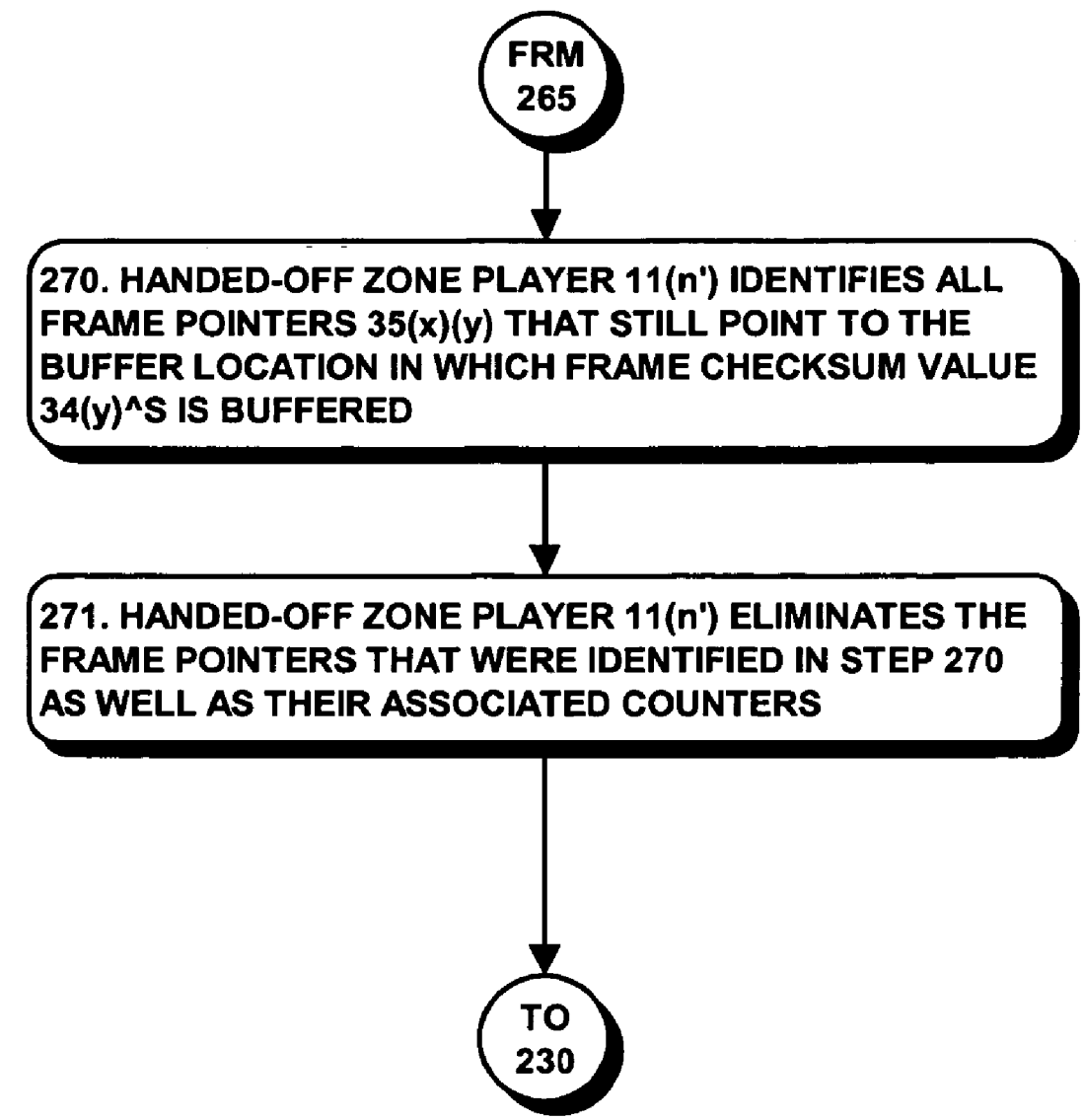

With this background, operations performed by the handing-off zone player $11(n)$ and the handed-off zone player $11(n')$ during the handoff operation will be described above in connection with the flow charts in FIGS. 5 and 6. The flow chart in FIG. 5 depicts the general operations performed by the handing-off and handed-off zone players $11(n)$ and $11(n')$ during the handoff operation. The flow chart in FIG. 6 depicts details of the operations performed by the handed-off zone player $11(n')$ in identifying the frame $31(y_n)^S$ in the audio information stream $30^S$ from the audio information source $17$ that corresponds to the frame $31(x_m)^C$ in the audio information stream $30^S$ from the handing-off zone player $11(n)$ and associating the identified frame $31(y_n)^S$ with the appropriate rendering timing information $33(y_n)^S$. As noted above, either the handed-off zone player $11(n')$ or the handing-off zone player $11(n)$ can generate the frame checksum values $34(x)^C$ for the frames $31(x)^C$ comprising the audio information stream $30^C$ that the handing off zone player $11(n)$ is to provide to the handed-off zone player $11(n')$. In the following, it will be assumed that the handed-off zone player $11(n')$ generates the frame checksum values $34(x)^C$ for the frames $31(x)^C$ after it receives the frames $31(x)^C$ from the handing-off zone player $11(n)$.

With reference to FIG. 5, when the "handing-off" zone player $11(n)$ that is the current audio information channel device $23$ for a synchrony group $20$ determines that the audio information channel device responsibility is to be handed off to another "handed-off" zone player $11(n')$ in connection with streaming audio information from a streaming audio information source $17$ (step $100$), the handing off zone player $1(n)$ it will provide a notification to the handed-off zone player $11(n')$ that the handed-off zone player $11(n')$ is to become the audio information channel device for the synchrony group $20$ (step $101$). The zone player that is to become the handed off zone player $11(n')$ can be selected using any of a variety of criteria. Preferably, the handed-off zone player $11(n')$ will comprise a member $21$, $22(g)$ of the synchrony group $20$ for which the handed-off zone player $11(n')$ will become the audio information channel device $23$. In addition, the handing-off zone player 11(n) can engage in negotiations with the various members 21, 22(g) of the synchrony group 20 prior to one of them being selected to become the audio information channel device 23 for the synchrony group 20.

The notification provided by the handing-off zone player 11(n) to the handed off zone player 11(n') can include several types of information, including the identification of the streaming audio information source 17 from which the other zone player 11(n') is to obtain the audio information stream, and may also include the identifications of the other members 21, 22(g) of the synchrony group 20. It will be appreciated that, since the handing-off zone player 11(n) has been operating as the audio information channel device 23 for the respective synchrony group 20, it will have been providing not only the respective audio information frames $31(x)^C$ for the audio program that is to be rendered by the synchrony group 20, but also the rendering timing information $33(x)^C$ indicating when the associated frames $31(x)^C$ is to be rendered, to the members 21, 22(g) of the synchrony group 20, including the handed-off zone player 11(n'). After the handed off zone player 11(n') receives information from the handing-off zone player 11(n) as to the audio information source 17 from which it is to obtain the audio information stream for the audio program, the handed-off zone player 11(n') can establish a connection to the streaming audio information source 17 and begin receiving the audio information stream 30 therefrom (step 102).

Continuing with the scenario in which the handing-off zone player 11(n) does not provide frame checksum values $33(n)^C$ for the respective audio information frames $31(x)^C$ that it has been transmitting to the synchrony group 20, the handing-off zone player 11(n) will continue provide the frames $31(x)^C$ to the synchrony group 20, including the handed-off zone player 11(n') (step 103). In addition, after the handed off zone player 11(n') begins receiving the successive frames $31(y)^S$ from the audio information source 17 that are associated with the audio program that is being rendered by the synchrony group 20, that zone player 11(n') can generate frame checksum values $31(y)^S$ for the respective frames $31(y)^S$ and compare them to the frame checksum values $34(x)^C$ that it generated for the frames $31(x)^C$ received from the handing off zone player 11(n) (step 104). After the handed off zone player 11(n') determines that a series of the frame checksum values $34(x_m)^C \ldots 34(x_m+M)^C$ that it generated for a selected number of successive frames $31(x_m)^C \ldots 31(x_m+M)^C$ that it receives from the handing off zone player 11(n) corresponds to the frame checksum values $34(y_n)^S \ldots 34(y_n+M)^S$ that it receives for a series comprising like number of frames $31(y_n)^S \ldots 31(y_n+M)^S$ from the audio information source 17 (step 105), the handed off zone player 11(n') can begin operating as the audio information channel device 23 for the synchrony group 20 using, for example, the rendering timing information $33(x_m+M)^C$ received from the handing-off zone player 11(n) and associated with frame $31(x_m+M)^C$ to determine the rendering timing information $33(y_n+N)^S$ that is to be associated with the frame $31(y_n+M)^S$, as well as subsequent frames that it receive from the audio information source 17 (step 106). In particular, the zone player 11(n') can notify the various members 21, 22(g) of the synchrony group 20, after which the members can begin receiving the audio and rendering timing information from the handed off zone player 11(n') (step 107). In addition, after all of the members 21, 22(g) have migrated over to the handed-off zone player 11(n'), it (that is, the handed off zone player 11(n')) can notify the handing off zone player 11(n) that it has assumed responsibility as the audio information channel device 23 for the synchrony group, after which the handing off zone player 11(n) can terminate operations in connection therewith (step 108).

As noted above, FIG. 6 depicts operations performed by the handed-off zone player 11(n') in connection with identifying the series of frames $31(y_n)^S \ldots 31(y_n+M)^S$ in the audio information stream $30^S$ from the audio information source 17 that corresponds to the series of frames $31(x_m)^C \ldots 31(x_m+M)^C$ in the audio information stream $30^C$ from the handing-off zone player 11(n). In connection with FIG. 6, it will be appreciated that the handed-off zone player 11(n') will be receiving the frames $31(x)^C$, along with the associated rendering timing information $33(x)^C$, from the handing-off zone player 11(n).

With reference to FIG. 6, when the handed-off zone player 11(n') receives a frame containing digital audio information (step 200), it will determine whether the frame is from the handing-off zone player 11(n) or the audio information source 17 (step 201). If the handed-off zone player 11(n') determines that the frame is from the handing-off zone player 11(n) (in which case it will be a frame $31(x)^C$), it will buffer the frame, along with the associated rendering timing information $33(x)^C$ (step 202). In addition, and in relation to the invention, the handed-off zone player 11(n') will generate a frame check value $34(x)^C$ for the frame $31(x)^C$ received in step 200 and buffer it in an associated buffer location (step 203).

After the handed-off zone player 11(n') has generated the frame checksum value $34(x)^C$ for the frame $31(x)^C$ received from the handing-off zone player 11(n), it will perform two series of operations in connection with the frame checksum value $34(x)^C$ that was generated in step 203. In connection with the first series of operations, which will be described in connection with steps 210 through 217, the handed-off zone player 11(n') will for the just-generated frame checksum value $34(x)^C$, initially identify frame checksum values $34(y)^S$ had been generated for frames $31(y)^S$, that had been received from the audio information source 17 that correspond to the frame checksum value $34(x)^C$. If an identified frame check value $34(y)^S$ is already associated with a frame pointer and counter, which will be the case if it is part of a sequence, the handed-off zone player 11(n') will update the respective frame pointer and counter. On the other hand, if an identified frame checksum values $34(y)^S$ is not already associated with frame pointers and counters, the handed-off zone player 11(n') will establish frame pointers and counters for those for the others.

In the second series of operations, the handed-off zone player 11(n') will perform a series of steps 220 through 221 to determine whether frame pointers and counters had been established for frame checksum values $34(y)^S$ that were not identified as described above. It the handed-off zone player 11(n') determines that there any such frame pointers and counters, it will eliminate them. It will be appreciated that, if there is such a frame pointer and associated counter, it would be associated with a sequence of frame checksum values associated with frames received from the audio information source 17 that corresponded to a sequence of frame checksum values associated with frames received from the handing-off zone player 11(n), up to the just-received frame $31(x)^C$. Since the sequence was interrupted at frame $31(x)^C$, those sequences will not be deemed to correspond, and so the handed-off zone player 11(n') can eliminate that frame pointer and associated counter.

With respect to the first series of operations, the handed-off zone player 11(n') will initially determine whether any of the frame checksum value(s) $34(y_a)^S$, $34(y_b)^S$, . . . , that it had previously generated for the frames $31(y_a)^S$, $31(y_b)^S$, ..., received from the audio information source 17 correspond to the frame checksum value $34(x)^C$ that it generated in step 203 (step 210). If the handed-off zone player 11(n') makes a positive determination in connection with step 210, it can select one of the frame checksum values, such as frame checksum value $34(y_a)^S$ (step 211), and determine whether a frame pointer has previously been established for a sequence that includes the just generated frame checksum value $34(x)^C$, and a sequence that includes the frame checksum value $34(y_a)^S$ (step 212). As described above, the handed-off zone player 11(n') can determine that two frame checksum values $34(x)^C$, $34(y_a)^S$ are associated with a frame pointer if the frame pointer's field 37(x) points to the buffer location associated with frame checksum value 34(x) and its field 38(y) points to the buffer location associated with the frame checksum value $34(y_a)^S$ that had been generated for the frame $31(y_a)^S$. If the handed-off zone player 11(n') makes a positive determination in step 212, it can update the associated frame pointer to point (a) to the buffer location in which the handed-off zone player 11(n') will store the frame checksum value $34(x+1)^C$ generated for the next frame $31(x+1)^C$ from the handing-off zone player 11(n) after has been received, and (b) to the frame checksum value $34(y_a+1)^S$ associated with frame $31(y_a+1)^S$ are or will be stored (step 213). In addition, the handed-off zone player 11(n') can increment the counter 36(x)(y) associated with the updated frame pointer (step 214).

Following step 214, or if negative determination is made in step 212, the handed-off zone player 11(n') can determine whether it has processed all of the frame checksum values $34(y_a)^S$, $34(y_b)^S$, ... that it had previously generated for the frames $31(y_a)^S$, $31(y_b)^S$, ..., received from the audio information source 17 that correspond to the frame checksum value(s) $34(x)^C$ that it generated in step 203 (step 215). If the handed-off zone player 11(n') makes a negative determination in step 215, it will return to step 211 and select the next frame checksum value, illustratively frame checksum value $31(y_b)^S$, that corresponded to the frame checksum value $34(x)^C$ that had been generated in step 203.

Returning to step 212, if the handed-off zone player 11(n') makes a negative determination in that step, that is, if it determines that a frame pointer has not previously been established for a sequence that includes the frame checksum value $34(x)^C$ that was generated for the just-received frame $31(x)^C$, and a sequence that includes the frame $31(y_a)^S$ associated with the selected frame checksum value $34(y_a)^S$, it will sequence to a step 216, in which it will establish a frame pointer $35(x)(y_a)$ and enable it to point to (a) the buffer location in which the frame checksum value $34(x+1)^C$ that will be generated for the next frame $31(x+1)^C$ will be stored after it has received, and (b) the buffer location in which the frame checksum value $34(y_a+1)^S$ associated with frame $31(y_a+1)^S$ is or will be stored. In addition, the handed-off zone player 11(n') will establish a counter $36(x)(y_a)$ associated with the just-established frame pointer (step 217). Following step 217, the handed-off zone player 11(n') will sequence to step 215 to determine whether it has processed all of the frame checksum values $34(y_a)^S$, $34(y_b)^S$, ... that it had previously generated for the frames $31(y_a)^S$, $31(y_b)^S$, ..., received from the audio information source 17 that correspond to the frame checksum value(s) $34(x)^C$ that it generated in step 203 (step 215). As described above, if the handed-off zone player 11(n') makes a negative determination in step 215, it will return to step 211 and select the next frame checksum value, illustratively frame checksum value $31(y_b)^S$, that corresponded to the frame checksum value $34(x)^C$ that had been generated in step 203.

The handed-off zone player 11(n') will perform the operations described above for each of the frame checksum value(s) $34(y_a)^S$, $34(y_b)^S$, ..., that it had previously generated for the frames $31(y_a)^S$, $31(y_b)^S$, ..., received from the audio information source 17 that it (that is, the handed-off zone player 11(n') had determined in step 210 correspond to the frame checksum value(s) $34(x)^C$ that it generated in step 203, until it determines in step 215 that it has processed all of the frame checksum values $34(y_a)^S$, $34(y_b)^S$, ... that it had previously generated for the frames $31(y_a)^S$, $31(y_b)^S$, ..., received from the audio information source 17 that correspond to the frame checksum value(s) $34(x)^C$ that it generated in step 203. At that point, the handed-off zone player 11(n') will have (i) updated the previously established frame pointers 35(x)(y) and associated counters 36(x)(y) that had previously been established for a sequence that includes the just received frame $31(x)^C$, and sequence(s) that includes the frames $31(y)^S$ associated with the frame checksum value(s) $34(y)^S$ that corresponded to the frame checksum value $34(x)^C$ that was generated in step 203 for the frame $31(x)^C$ that had been received in step 200, and/or (ii) established respective frame pointers 35(x)(y) and associated counters 36(x)(y) for frame checksum values $34(y)^S$ for which no frame pointers and counters had that had previously been established, thereby completing the first series of operations described above. Thereafter, the handed-off zone player 11(n') will perform a series of steps 220 through 221 to determine whether other frame pointers and counters had been established, and eliminate them.

Accordingly, when the handed-off zone player 11(n') determines in step 215 that it has processed all of the frame checksum values $34(y_a)^S$, $34(y_b)^S$, ... that it had determined in step 210 correspond to the frame checksum value $34(x)^C$ that generated in step 203, it (that is, the handed-off zone player 11(n')) will sequence to step 220. In that step, the handed-off zone player 11(n') will identify all frame pointers 35(x)(y) that still point to the buffer location in which frame checksum value $34(x)^C$ is buffered (step 220). It will be appreciated that, when the frame pointers are established or updated for a frame such as frame $31(x)^C$, they will point, not to the buffer location in which the frame checksum value $34(x)^C$ itself is buffered, but instead to the buffer location in which the frame $31(x+1)^C$ will be buffered. Accordingly, the only frame pointers that still point to the buffer location in which the frame $31(x)^C$ has been buffered are those frame pointers that have not been updated, which, in turn, will be associated with frame checksum values $34(y)^S$ that did not correspond to the frame check value $34(x)^C$ that had been generated in step 203. Accordingly, following step 220, the handed-off zone player 11(n') can merely eliminate the frame pointers that were identified in step 220 as well as their associated counters (step 221).

Following step 221, the handed-off zone player 11(n') will sequence to a series of steps 230 through 237 to determine whether the values of any of the then-existing counters 36(x)(y) corresponds to "M," that is, the threshold value at which the handed-off zone player 11(n') may determine that it has identified a sequence of frames, for example frames $31(x_1)^C \ldots 31(x_1+M)^C$, received from the handing-off zone player 11(n) corresponds to a sequence of frames, for example, frames $31(y_2)^S \ldots 31(y_2+M)^S$, received from the audio information source 17. Accordingly, in step 230, the handed-off zone player 11(n') will determine whether the value of at least one of the counters $36(x_m)(y_n)$ corresponds to at least "M+1."

If the handed-off zone player $11(n')$ makes a negative determination in step $230$, it will return to step $200$ and wait for the next frame $31(x+1)^C$ in the audio information stream $30^C$ from the handing-off zone player $11(n)$ or the next frame $31(y+1)^S$ in the audio information stream $30^S$ from the audio information source $17$. The handed-off zone player $11(n')$ will perform the operations described above in connection with steps $200$ through $230$ through a plurality of iterations, as it receives the frames $31(x)^C$ from the handing-off zone player $11(n)$ and frames $31(y)^S$ from the audio information source $17$.

On the other hand, if the handed-off zone player $11(n')$ makes a positive determination in step $230$, that is, if it determines that the value of at least one counter $36(x_m)(y_n)$ corresponds to at least "M+1," it (that is, the handed off zone player $11(n')$) will sequence to step $231$. In step $231$, the handed-off zone player $11(n')$ will determine whether the values of at least two counters, for example, counters $36(x_m)(y_n)$ and $36(x_m')(y_n')$ (where either $x_m$ does not equal $x_m'$, or $y_n$ does not equal $y_n'$ or both), correspond to at least "M+1." In that case, the handed-off zone player $11(n')$ will select the counters, for example, counters $36(x_m)(y_n)$ and $36(x_m')(y_n')$ whose values are the highest (step $232$) and determine whether the values of those counters are equal (step $233$). If the handed-off zone player $11(n')$ determines in step $233$ that the values of at least two of the selected counters are equal, it will also return to step $200$ and wait for the next frame $31(x+1)^C$ in the audio information stream $30^C$ from the handing-off zone player $11(n)$ or the next frame $31(y+1)^S$ in the audio information stream $30^S$ from the audio information source $17$.

The handed-off zone player $11(n')$ will perform the operations described above in connection with steps $200$ through $233$ through a plurality of iterations, as it receives the frames $31(x)^C$ from the handing-off zone player $11(n)$ and frames $31(y)^S$ from the audio information source $17$, until it makes a negative determination in step $233$. It will be appreciated that, if the handed-off zone player $11(n')$ makes a negative determination in step $233$, there may be several counters whose values are higher than "M+1," but there will be only one counter whose value is the maximum. If the handed-off zone player $11(n')$ makes a negative determination in step $233$, it will sequence to step $234$, in which it will identify the counter, for example, counter $36(x_m)(y_n)$ or $36(x_m')(y_n')$, that has the highest value, and select the frame pointer $35(x_m)(y_n)$ or $35(x_m')(y_n')$ that is associated with the identified counter (step $235$). For example, if the handed-off zone player $11(n')$ determines that the value of the counter $36(x_m)(y_n)$ is higher than the value of the counter $36(x_m')(y_n')$, it will select the frame pointer $35(x_m)(y_n)$ in step $235$. On the other hand, if the handed-off zone player $11(n')$ determines that the value of the counter $36(x_m')(y_n')$ is higher than the value of the counter $36(x_m)(y_n)$, it will select the frame pointer $35(x_m')(y_n')$ in step $235$.

Returning to step $231$, if the handed-off zone player $11(n')$ determines in that step that the value of only one counter, such as counter $36(x_m)(y_n)$, has the value "M+1," it will select the frame pointer $35(x_m)(y_n)$ associated with that counter as pointing to the (step $236$). It will be appreciated that the pointer selected in step $236$ will include fields $37(x_m)$ and $37(y_n)$ that point to the corresponding frames $31(x_m)^C$ and $31(y_n^S)$ in the audio information streams $30^C$ and $30^S$ from the handing-off zone player $11(n)$ and the audio information source $17$.

It will be appreciated that the frame pointer, illustratively frame pointer $35(x_m)(y_n)$, that was selected in step $235$ or $236$ will point to the frame $31(x_m)^C$ in the audio information stream from the handing-off zone player $11(n)$ that corresponds to the frame $31(y_m)^S$ in the audio information stream $30^S$ from the audio information source $17$. Accordingly, following step $235$ or $236$, the handed-off zone player $11(n')$ will sequence to step $237$ in which it will utilize the rendering timing information $33(x_m)^C$ that was stored for the frame $31(x_m)^C$ from the handing-off zone player $11(n)$ to determine the rendering timing information $33(y_n)^S$, $33(y_n+1)^S$, $33(y_n+2)^S$, ... for the successive frames $31(y_n)^S$, $31(y_n+1)^S$, $31(y_n+2)^S$, .. (step $237$).

Returning to step $201$, if the handed-off zone player $11(n')$ determines in that step that the frame that was received in step $200$ is from the audio information source $17$ (in which case it will be a frame $31(y)^S$), it will sequence to a step $253$ in which it (that is, the handed-off zone player $11(n')$) will generate a frame check value $34(y)^S$ for the particular frame $31(y)^S$ and buffer it in a respective buffer location (step $253$; compare step $203$ above). The handed-off zone player $11(n')$ may also, but will not at that point need to, buffer the frame $31(y)^S$ that it just received. It will not need to buffer the frame $31(y)^S$ that was just received since it will not, at that point, be providing audio and rendering timing information to the synchrony group $20$. It will be appreciated that the handed-off zone player $11(n')$ will continue to render the audio information stream $30^C$ provided by the handing-off zone player $11(n)$ at least until it has identified corresponding sequences of frame checksum values generated for frames in the audio information streams $30^C$ and $30^S$ of sufficient length that permit it to determine that it has found frames at corresponding positions in the respective streams. After the handed-off zone player $11(n')$ determines that is has found frames at corresponding positions in the two streams $30^C$, it can start buffering the frames $31(y)^S$ that it receives from the audio information source $17$. In addition, it will be appreciated that, at this point in time, the handed-off zone player $11(n')$ will also not have rendering timing information $33(y)^S$ to that it will associate with the respective frame $31(y)^S$. In any case, the handed-off zone player $11(n')$ can, after it determines that a frame $31(y)^S$ that it received in step $200$ was from the audio information source $17$, it will thereafter perform operations similar to those described above in connection with steps $210$ through $221$ to (a) identify, for the frame checksum value $34(y)^S$ that was generated for a frame $31(y)^S$ that was just received from the audio information source $17$, the frame checksum values $34(x_1)^C$, $34(x_2)^C$, $34(x_3)^C$, $34(x_4)^C$... that had been generated for frames $31(x_1)^C$, $31(x_2)^C$, $31(x_3)^C$, $31(x_1)^C$, ... that were received from the handing-off zone player $11(n)$ that correspond to the just-received frame checksum value $34(y)^S$ (compare steps $210$ through $217$ above), (i) for those checksum values $34(x_1)^C$, $34(x_2)^C$, ... that were associated with respective frame pointers and counters, update the respective frame pointers and counters as described above (reference steps $260$ through $265$ on FIG. $6$; compare steps $210$ through $215$ above), and (ii) for those checksum values $34(x_3)^C$, $34(x_3)^C$, ... that were not associated with respective frame pointers and counters, establish and initialize respective frame pointers and counters, also as described above (reference steps $266$ and $267$, together with step $265$ on FIG. $6$; compare steps $216$ and $217$, together with step $215$, above;), (b) identify, the frame pointers that had been previously established that point to the frame checksum values $34(x_5)^C$, $34(x_6)^C$, ... that had been generated for frames $31(x_5)^C$, $31(x_6)^C$, ... from the audio information source $17$, which frame pointers also point to the just generated frame checksum value $34(y)^S$ for the frame from the audio information source 17, and eliminate those frame pointers and associated counters (reference steps 270 and 271 on FIG. 6; compare steps 220 and 221 above), and (c) perform the operations to determine when the values of the counters are such as to enable the handed-off zone player 11(n') to determine that it can determine that a frame sequence $31(x_1)^C \ldots 31(x_1+M+i)^C$ ("i" equals 0, 1, . . .) from the handing-off zone player 11(n) corresponds to a frame sequence $31(y_1)^S \ldots 31(y_1+M+i)^S$ from the audio information source 17 (reference steps 230 through 237; following step 271, the handed-off zone player 11(n') sequences to these steps).

As noted above, after the handed-off zone player 11(n') has determined that a frame sequence $31(x_1)^C \ldots 31(x_1+M+i)^C$ ("i" equals 0, 1, . . .) from the handing-off zone player 11(n) corresponds to a frame sequence $31(y_1)^S \ldots 31(y_1+M+i)^S$ from the audio information source 17, it (that is, the handed-off zone player 11(n')) will be able to determine appropriate rendering timing information that it can associate with the audio information that is subsequently receives from the audio information source 17, and thus will be in a position to notify the other members 21, 22(g) of the synchrony group 20 that it is to become the audio information channel device 23.

FIG. 6 also depicts steps 253 through 271 that are generally described above. However, since the operations performed in connection with those steps 253 through 271 substantially correspond to the operations described above in connection with steps 203 through 221, the individual steps will not be described herein.

The invention provides a number of advantages. In particular, the invention provides an arrangement whereby a device, such as handed-off zone player 11(n'), can determine a position in one information stream provided by one source, such as the audio information stream provided by the audio information source 17, that corresponds to the same position in another information stream containing the same information provided by a second source, such as the audio information provided by the handing-off zone player 11(n). It will be appreciated that the device, such as the handed-off zone player 11(n'), may use the position determination for any of a number of purposes; in the context of the specific embodiment described herein, the handed-off zone player 11(n') uses the determination to facilitate association of the audio information stream from the audio information source 17 with rendering timing information that it determines in relation to the rendering timing information that had been received from the handing-off zone player 11(n), after which the handing-off zone player 11(n) can terminate providing the audio information and rendering timing information to the handed-off zone player 11(n') and any other devices it has been providing the information to. It will be appreciated that the invention is memory-efficient, since it only requires the handed-off zone player 11(n') to keep and make use of the frame checksum values $34(x)^C$ and $34(y)^S$ that have been generated for the various frames $31(x)^C$ and $31(y)^S$ received from the handing-off zone player 11(n) and audio information source 17, respectively. In addition, the algorithm that is used to determine the correspondence between the two audio information streams $30^C$ and $30^S$ is computationally efficient.

It will be appreciated that numerous changes and modifications can be made to the arrangement described herein. For example, although, as described above, the handed-off zone player 11(n') generates the frame checksum values for both the frames $31(x)^C$ received from the handing-off zone player 11(n) and the frames $31(y)^S$ received from the audio information source 17, it will be appreciated that either or both of the handing-off zone player 11(n) or the audio information source 17 can generate the frame checksum values for the information that they provide to the handed-off zone player 11(n'). In addition, it will be appreciated that the frame checksum values can be generated using any convenient algorithm.

In addition, although the arrangement has been described with the handed-off zone player 11(n') generating a frame checksum value $34(x)^C$, $34(y)^S$ on a frame-by-frame basis, it will be appreciated that the handed-off zone player 11(n') (or the handing-off zone player 11(n) and/or audio information source 17)) can generate the frame checksum values using any convenient units of information, such as several frames, subsets of frames (such as groupings of samples 32(n)(s)), and so forth.

Furthermore, although the invention has been described in connection with streaming audio information, it will be appreciated that the invention may find utility in connection with finding correspondences between other information streams that are not audio, and, in addition, may find utility in connection with finding correspondences between two sequences of information that are not streaming.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications maybe made to the invention, with the attainment of some or all of the advantages of the invention. It is the object of the appended claims to cover these and such other variations and modifications as come within the true spirit and scope of the invention.

It is noteworthy that exemplary embodiments may include a computer program product for use in connection with a computer to provide a device for determining correspondences in connection with two information streams received from two information sources. The computer program product may comprise a computer-readable medium. The computer-readable medium may have encoded thereon an information receiver module configured to enable the computer to receive the two information streams, a position identifier module configured to enable the computer to identify corresponding positions regarding corresponding sequences in the two information streams, and a corresponding position utilization module configured to enable the computer to utilize the identification of the corresponding positions in the two information streams.

What is claimed as new and desired to be secured by Letters Patent of the United States is:

1. A device for synchronizing two information streams, the device comprising:

an information receiver module configured to receive the two information streams, wherein the two information streams contain identical sequences of frames and the frames lack self-identifying information;

a position identifier module stored in memory and executable by a processor to identify corresponding frames in the two information streams by:
  generating identifying information about the frames contained in the two information streams by calculating frame checksum values,
  performing a comparison between a pair of frame checksum values series associated with the two information streams, and
  controlling a frame pointer indicative of each pair of corresponding frames based on the comparison between the pair of frame checksum values series; and
a correspondence utilization module stored in memory and executable by a processor to utilize the frame pointers to synchronize the two information streams.

2. The device of claim 1, wherein the frame checksum values are calculated as the information streams are received.

3. The device of claim 1, wherein the position identifier module is executable to control a respective counter for each frame pointer to identify the number of frames in each sequence of frames, wherein controlling the frame pointer indicative of each pair of corresponding frames in further based on the counters.

4. The device of claim 1, wherein at least a minimum number of frames are identified as corresponding prior to execution of the correspondence utilization module to synchronize the two information streams.

5. The device of claim 1, wherein the information streams include digital media information.

6. The device of claim 5, wherein the information streams include digital audio information.

7. The device of claim 1, wherein each frame includes a selected number of digital media samples, and each frame checksum value is a function of the digital media samples in the respective frame.

8. A method for synchronizing two information streams, the method comprising:
  receiving the two information streams wherein the two information streams contain identical sequences of frames and the frames lack self-identifying information;
  executing instructions stored in memory to identify corresponding frames in the two information streams by:
    generating identifying information about the frames contained in the two information streams by calculating frame checksum values,
    performing a comparison between a pair of frame checksum values series associated with the two information streams, and
    controlling a frame pointer indicative of each pair of corresponding frames based on the comparison between the pair of frame checksum values series; and
  executing instructions stored in memory to utilize the frame pointers to synchronize the two information streams.

9. The method of claim 8, wherein the frame checksum values are calculated as the information streams are received.

10. The method of claim 8, wherein executing instructions stored in memory to identify the corresponding frames further includes controlling a respective counter for each frame pointer to identify the number of frames in each sequence of frames, wherein controlling the frame pointer indicative of each pair of corresponding frames is further based on the counters.

11. The method of claim 8, wherein at least a minimum number of frames are identified as corresponding prior to synchronizing the two information streams.

12. The method of claim 8, wherein the information streams include digital media information.

13. The method of claim 8, wherein the information streams include digital audio information.

14. The method of claim 8, wherein each frame includes a selected number of digital media samples, and each frame checksum value is a function of the digital media samples in the respective frame.

15. A computer readable storage medium having a program embodied thereon, the program executable by a processor to perform a method for synchronizing two information streams, the method comprising:
  receiving the two information streams, wherein the two information streams contain identical sequences of frames and the frames lack self-identifying information;
  identifying corresponding frames in the two information streams by:
    generating identifying information about the frames contained in the two information streams by calculating frame checksum values,
    performing a comparison between a pair of frame checksum values series associated with the two information streams, and
    controlling a frame pointer indicative of each pair of corresponding frames based on the comparison between the pair of frame checksum values series; and
  utilizing the frame pointers to synchronize the two information streams.

16. The computer readable storage medium of claim 15, wherein the frame checksum values are calculated as the information streams are received.

17. The computer readable storage medium of claim 15, wherein identifying the corresponding frames further includes controlling a respective counter for each frame pointer to identify the number of frames in each sequence of frames, wherein controlling the frame pointer indicative of each pair of corresponding frames is further based on the counters.

18. The computer readable storage medium of claim 15, wherein at least a minimum number of frames are identified as corresponding prior to synchronizing the two information streams.

19. The computer readable storage medium of claim 15, wherein the information streams include digital media information.

20. The computer readable storage medium of claim 15, wherein the information streams include digital audio information.

21. The computer readable storage medium of claim 15, wherein each frame includes a selected number of digital media samples, and each frame checksum value is a function of the digital media samples in the respective frame.

* * * * *

UNITED STATES PATENT AND TRADEMARK OFFICE
CERTIFICATE OF CORRECTION

PATENT NO. : 7,668,964 B2  Page 1 of 1
APPLICATION NO. : 11/113363
DATED : February 23, 2010
INVENTOR(S) : Nicholas A. J. Millington It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Seventh Day of December, 2010

David J. Kappos
*Director of the United States Patent and Trademark Office*